United States Patent
Chi et al.

(10) Patent No.: US 10,210,319 B2
(45) Date of Patent: Feb. 19, 2019

(54) MOBILE TERMINAL AND CONTROL METHOD FOR THE MOBILE TERMINAL

(71) Applicant: LG ELECTRONICS INC., Seoul (KR)

(72) Inventors: Jumin Chi, Seoul (KR); Eunhye Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 331 days.

(21) Appl. No.: 15/050,868

(22) Filed: Feb. 23, 2016

(65) Prior Publication Data

US 2016/0350522 A1   Dec. 1, 2016

(30) Foreign Application Priority Data

Jun. 1, 2015   (KR) .................. 10-2015-0077420

(51) Int. Cl.
| | |
|---|---|
| *G06F 21/32* | (2013.01) |
| *G06F 3/041* | (2006.01) |
| *G06F 3/0484* | (2013.01) |
| *G06F 3/0485* | (2013.01) |
| *G06F 3/0488* | (2013.01) |
| *G06F 21/60* | (2013.01) |
| *G06K 9/00* | (2006.01) |
| *G06F 21/84* | (2013.01) |
| *G06F 9/451* | (2018.01) |

(52) U.S. Cl.
CPC ............ *G06F 21/32* (2013.01); *G06F 3/0412* (2013.01); *G06F 3/0485* (2013.01); *G06F 3/04842* (2013.01); *G06F 3/04845* (2013.01); *G06F 3/04883* (2013.01); *G06F 9/453* (2018.02); *G06F 21/604* (2013.01); *G06F 21/84* (2013.01); *G06K 9/00006* (2013.01)

(58) Field of Classification Search
CPC ...... G06F 21/32; G06F 21/84; G06F 3/04883; G06K 9/00006
USPC ........................................... 726/19
See application file for complete search history.

(56) References Cited

U.S. PATENT DOCUMENTS

| | | | | |
|---|---|---|---|---|
| 2012/0291121 | A1* | 11/2012 | Huang | G06F 21/32 726/19 |
| 2013/0257758 | A1* | 10/2013 | Huang | G06F 3/041 345/173 |
| 2014/0028589 | A1 | 1/2014 | Reilly | |
| 2014/0101737 | A1* | 4/2014 | Rhee | G06F 21/32 726/6 |
| 2014/0359757 | A1* | 12/2014 | Sezan | G06F 21/32 726/19 |

(Continued)

*Primary Examiner* — Teshome Hailu
(74) *Attorney, Agent, or Firm* — Birch, Stewart, Kolasch & Birch, LLP

(57) ABSTRACT

A mobile terminal including a touch screen configured to display screen information; and a controller configured to in response to a preset touch applied to the touch screen, move the screen information on the touch screen along a touch direction of the preset touch so as to sequentially display additional screen information on the touch screen, and display guide information on the touch screen for performing an authentication process to view secured information corresponding to the screen information when a last portion of the screen information is displayed in response to the preset touch.

8 Claims, 39 Drawing Sheets

(56) References Cited

U.S. PATENT DOCUMENTS

2015/0074615 A1   3/2015   Han et al.
2016/0299556 A1* 10/2016  Jueng .................... G06F 3/0487

* cited by examiner

MOBILE TERMINAL AND CONTROL METHOD FOR THE MOBILE TERMINAL

CROSS-REFERENCE TO RELATED APPLICATION

Pursuant to 35 U.S.C. § 119(a), this application claims the benefit of earlier filing date and right of priority to Korean Application No. 10-2015-0077420, filed on Jun. 1, 2015, the contents of which is incorporated by reference herein in its entirety.

BACKGROUND OF THE INVENTION

1. Field of the Invention

An object of the present disclosure is to provide an electronic device capable of more intuitively controlling a letterbox contained in an image and a control method thereof.

2. Description of the Related Art

Terminals can be divided into mobile/portable terminals and stationary terminals. Also, the mobile terminals can be classified into handheld terminals and vehicle mount terminals. As it becomes multifunctional, a mobile terminal can capture still images or moving images, play music or video files, play games, receive broadcast and the like, so as to be implemented as an integrated multimedia player.

In addition, information associated with personal privacy such as personal information, security information and the like are stored in the terminal. However, this is a problem because information associated with privacy has a high risk of being exposed to a third party having no authority from the user when the terminal is lost.

SUMMARY OF THE INVENTION

Accordingly, one object of the present disclosure is to provide a mobile terminal that enhances security and a control method thereof.

Another object of the present disclosure is to provide a mobile terminal allowing only an authorized user to access specific information or a specific function, and a control method thereof.

Still another object of the present disclosure is to provide a mobile terminal providing a graphic user interface allowing a user to access security set information or function in a more intuitive and convenient manner, and a control method thereof.

To achieve these and other advantages and in accordance with the purpose of the present invention, as embodied and broadly described herein, the present invention provides in one aspect a mobile terminal including a touch screen configured to display screen information; and a controller configured to in response to a preset touch applied to the touch screen, move the screen information on the touch screen along a touch direction of the preset touch so as to sequentially display additional screen information on the touch screen, and display guide information on the touch screen for performing an authentication process to view secured information corresponding to the screen information when a last portion of the screen information is displayed in response to the preset touch. The present invention also provides a corresponding method of controlling a mobile terminal.

In another aspect, the present invention provides a mobile terminal including a touch screen; a fingerprint recognition sensor configured to recognize a fingerprint of a finger in contact with the fingerprint recognition sensor; and a controller configured to display screen information on the touch screen, display a graphic object on the touch screen associated with accessing secured information in response to a preset fingerprint recognized through the fingerprint recognition sensor when the screen information is displayed on the touch screen, and display the secured information based on a preset touch applied to the graphic object. The present invention also provides a corresponding method of controlling a mobile terminal.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1A:
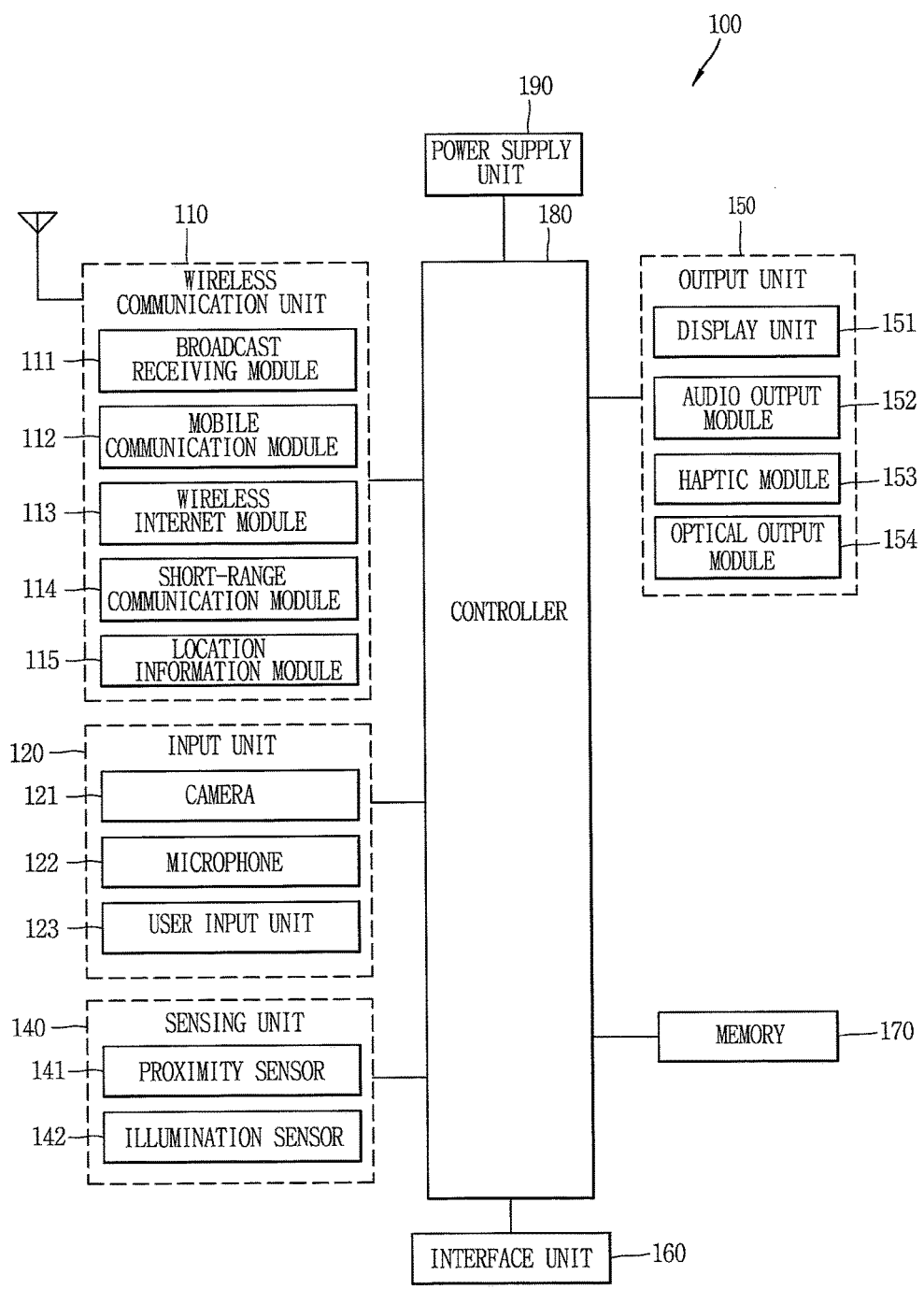
FIG. 1A is a block diagram illustrating a mobile terminal according to an embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. Also, the accompanying drawings are merely illustrated to explain the concept of the invention, and therefore, they should not be construed to limit the technological concept disclosed herein by the accompanying drawings, and the concept of the present disclosure should be construed as being extended to all modifications, equivalents, and substitutes in addition to the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like. However, the present invention may be also applicable to a fixed terminal such as a digital TV, a desktop computer and a digital signage, except for specific configurations for mobility.

Figure 1B:
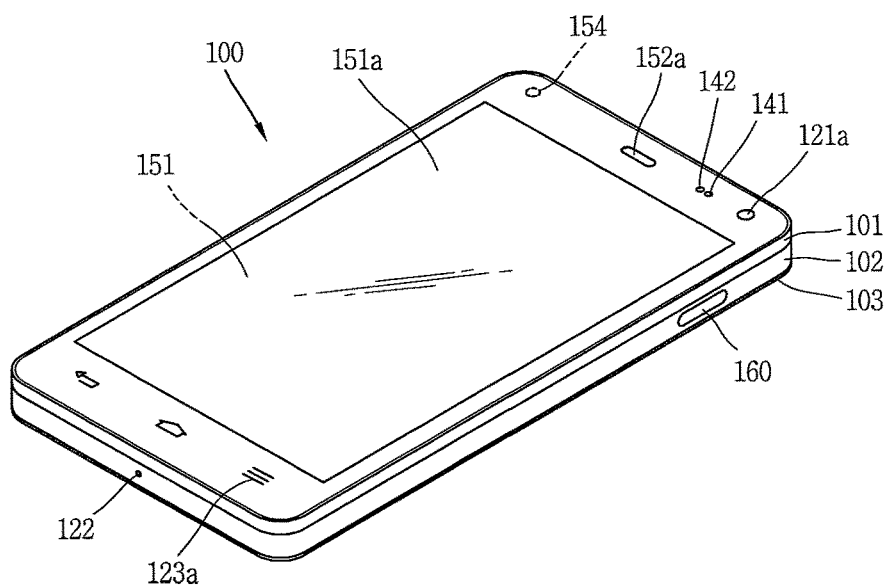
FIGS. 1B and 1C are conceptual views in which an example of a mobile terminal according to an embodiment of the present disclosure is seen from different directions.
Figure 1C:
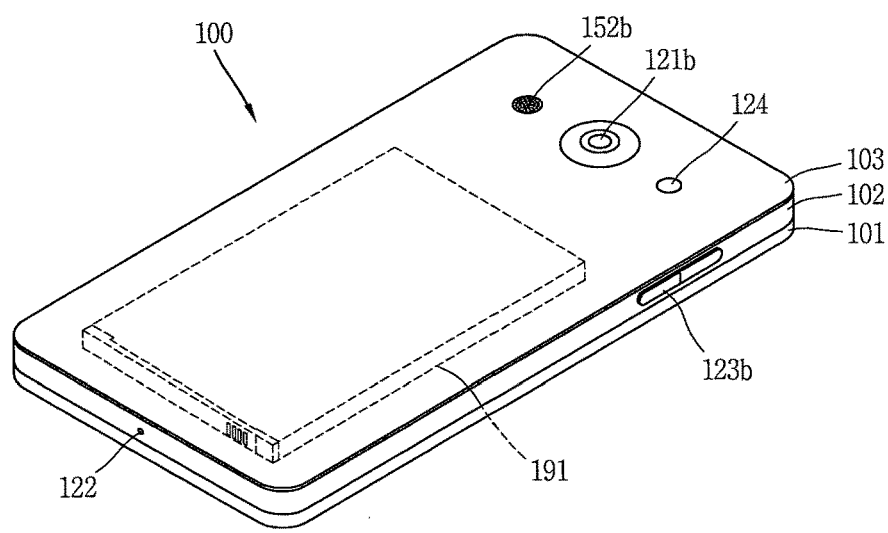

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components of FIG. 1A is not a requirement, and that greater or fewer components may alternatively be implemented.

Referring now to FIG. 1A, the mobile terminal 100 is shown having the wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, the controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as the display unit 151, using any of a variety of touch methods. Examples of such touch methods include a resistive type, a capacitive type, an infrared type, and a magnetic field type, among others. As one example, the touch sensor may be configured to convert changes of pressure applied to a specific portion of the display unit 151, or convert capacitance occurring at a specific portion of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. In addition, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition. The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The display unit 151, the first audio output module 152a, the second audio output module 152b, the proximity sensor 141, the illumination sensor 142, the optical output module 154, a first camera 121a, a second camera 121b, the first manipulation unit 123a, the second manipulation unit 123b, the microphone 122, the interface 160, etc. may be provided at the mobile terminal 100.

As shown in FIGS. 1B and 1C, the display unit 151, the first audio output module 152a, the proximity sensor 141, the illumination sensor 142, the optical output module 154, the first camera 121a and the first manipulation unit 123a are arranged on a front surface of the terminal body. The second manipulation unit 123b, the microphone 122 and the interface 160 are arranged on side surfaces of the terminal body. And the second audio output module 152b and the second camera 121b are arranged on a rear surface of the terminal body.

However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit.

When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display. The display unit 151 may also form a touch screen together with the touch sensor. In addition, the touch screen may serve as the user input unit 123 (see FIG. 1A). Therefore, the touch screen may replace at least some of the functions of the first manipulation unit 123a.

The first audio output module 152a may be implemented in the form of a receiver, and the second audio output module 152b may be implemented in the form of a loud speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further, in recent years, as various functions are provided by a terminal, information such as photos, documents, contacts, and the like are stored in the mobile terminal. Accordingly, a mobile terminal according to an embodiment of the present disclosure allows only a previously authorized user (or preset user) to access specific information, specific content, a specific function or specific application for the protection of the information. Further, according to the present specification, "specific information, specific content, a specific function or specific application for which security is set" may be collectively referred to as "security set information" or as "secured information."

In addition, "security set information" described in the present disclosure can be determined based on a user's selection. For example, any content (or information, a function, an application) for which security is not set, namely, general information, may be security processed by the user" selection. In addition, "security processed" denotes converting general information into security set information that is unable to be displayed without performing an authentication process for displaying it on the terminal. The authentication process is performed to display security set information, and when an authentication process is completed, namely, when authentication is successful, the security set information is displayed on the terminal. The authentication process may be performed through any one of various authentication modes, and which will be described later.

Figure 2:
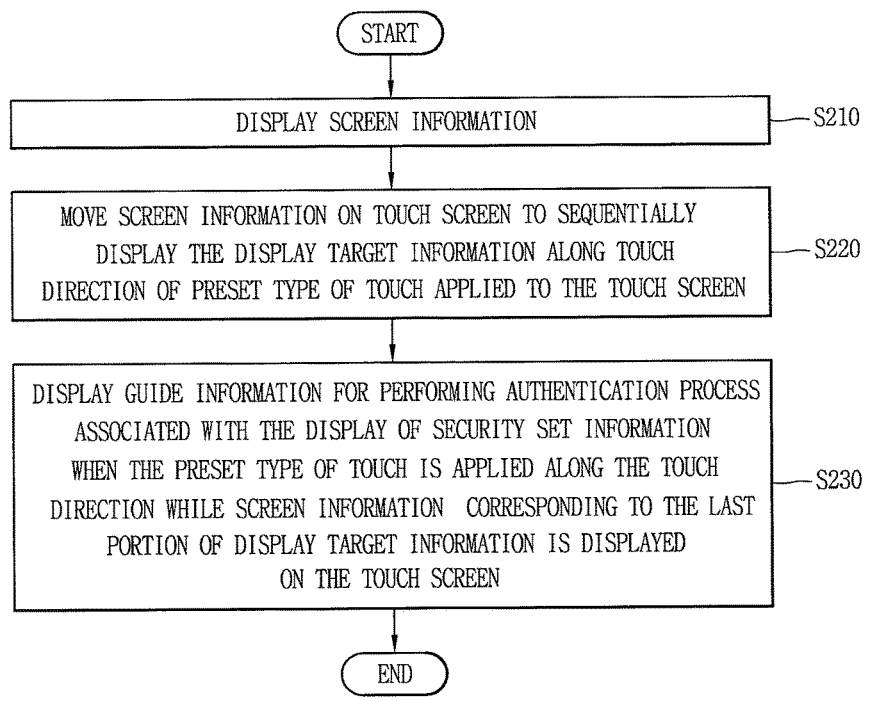
FIG. 2 is a flow chart illustrating a control method according to an embodiment of the present disclosure.

A mobile terminal according to an embodiment of the present disclosure and a control method thereof provides a user interface allowing a user who has authority to access security set information to more easily access the security set information, and will be described in more detail with reference to the accompanying drawings. In particular, FIG. 2 is a flow chart illustrating a control method according to an embodiment of the present disclosure, and FIGS. 3(a) to 3(c) include conceptual views illustrating a control method illustrated in FIG. 2.

A mobile terminal according to an embodiment of the present disclosure can display guide information associated with the display of security set information based on a preset type of touch to the touch screen 151 when screen information is displayed on the touch screen 151. More specifically, a plurality of control commands may be defined for a preset type of touch to perform a different control even when the same touch is applied to the touch screen 151 according to the status of screen information currently displayed on the touch screen.

In addition, the preset type of touch may be a touch for moving, dragging or scrolling screen information displayed on the touch screen. In other words, the preset type of touch may be a touch for changing the display position of previously displayed screen information by moving screen information displayed on the touch screen. When the previously displayed screen information moves in response to the preset type of touch, different screen information can be displayed on the touch screen. Further, the mode of the preset type of touch is irrelevant to its mode such as a drag touch, a flick touch, and the like, and is merely a touch for which a control command for moving screen information displayed on the touch screen is defined.

Further, in a mobile terminal according to an embodiment of the present disclosure, a control command for a different function can be additionally defined for the preset type of touch defined with a control command for moving the screen information. In addition, the different function corresponds to a function associated with the display of security set information.

More specifically, according to an embodiment of the present disclosure, when screen information displayed on the touch screen 151 no longer moves, namely when the preset type of touch is applied in a direction to which no further target information exists, guide information for performing an authentication process associated with the display of the security set information can be displayed.

When an authentication process is performed based on the display of the guide information, the controller 180 can display security set information on the touch screen 151. In this instance, when target information no longer exists in a direction to which the preset type of touch is applied may correspond to displayable general information among target information no longer existing along a direction to which the touch is applied.

Figure 3A:
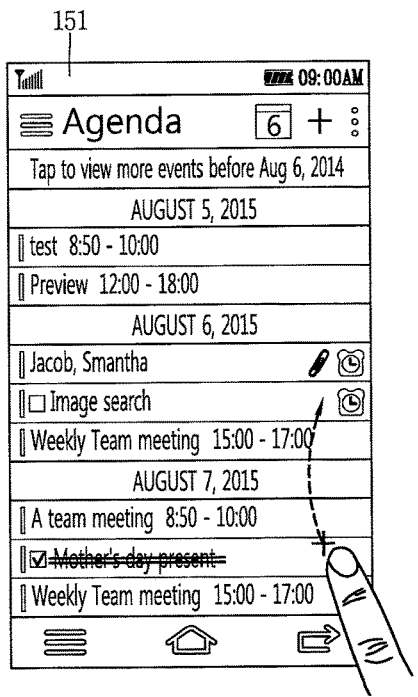
FIGS. 3(a) to 3(c) are conceptual views illustrating a control method illustrated in FIG. 2.
Figure 3B:
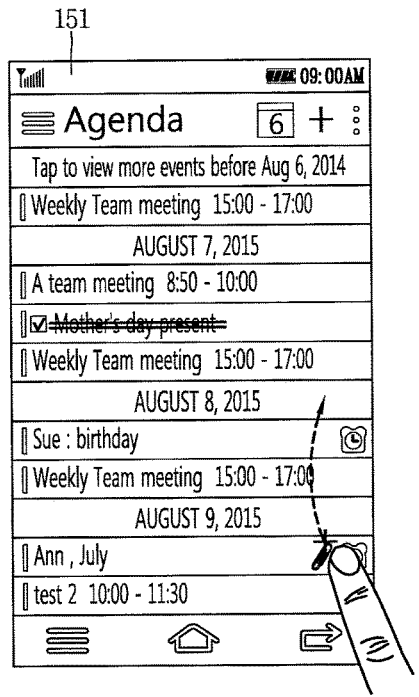
Figure 3C:

As shown in FIG. 2, the controller 180 displays screen information on the display unit 151 (S210). In this embodiment, the type of displayed screen information includes various types, and corresponds to which function or which application is currently being executed in the terminal. For example, as illustrated in FIG. 3(a), screen information corresponding to an execution screen of schedule application is displayed on the touch screen 151. When a preset type of touch is applied to the displayed screen information, the controller 180 moves the screen information on the touch screen 151 to sequentially display target or additional information along the preset type of touch direction (S220).

Through the movement, information displayed on the touch screen 151 may be scrolled or changed.

In addition, the preset type of touch such as a drag touch, a flick touch, and the like, is a control command for moving screen information displayed on the touch screen 151 as illustrated in FIG. 3(*b*). Further, the screen information displayed on the touch screen 151 moves along a touch direction of the preset type of touch, and at least part of target information is newly displayed on the touch screen 151 in connection with the movement. In addition, the target information includes information that is displayable on the touch screen 151 when the currently displayed information disappears from the touch screen 151.

In another example, target information denotes information displayed on the touch screen 151 according to a control command for scrolling or moving screen information displayed on the touch screen 151. For example, sometimes no more screen information is available even though the preset type of touch is applied in a specific direction with respect to screen information currently displayed on the touch screen 151.

In addition, as the screen information corresponding to currently displayed screen information, new screen information corresponds to information or content provided through an application corresponding to the currently displayed screen information. In this instance, the new screen information does not include information for guiding a touch direction or guiding a specific function.

In another example, as a virtual concept, screen information currently displayed on the touch screen 151 includes information included in any one portion of an arbitrary page. Furthermore, when the preset type of touch is applied, the controller 180 can display another portion of the arbitrary page along a touch direction of the preset type of touch. In addition, information included in the arbitrary page may be target information. When the screen information displayed on the touch screen 151 corresponds to the last portion of the arbitrary page, the controller 180 can no longer display information included in the arbitrary page but in a portion different from the currently displayed screen information.

In addition, the arbitrary page may be defined with various concepts such as an execution screen page of application, a webpage, a processing unit of information, an information range corresponding to the same layer, and the like. Further, according to an embodiment of the present disclosure, "changing screen information" corresponds to moving a page (or move a display range of page) to change a portion displayed on the display unit within an arbitrary page having a predetermined length or predetermined amount of information.

Further, the amount or unit of target information can be determined by the setting of each application or determined based on the amount of information downloaded through the wireless communication unit 110 or determined by the controller 180. For example, as illustrated in FIGS. 3(*a*) to 3(*c*), when an execution screen of schedule application is displayed and the scope of target information is a monthly schedule, if at least part of the August schedule is currently displayed on the touch screen 151, then the target information may be the entire August schedule. Accordingly, when currently displayed schedule information moves along a touch direction of the preset type of touch, another portion of August schedule is displayed on the touch screen 151.

In another example, when a preset type of touch facing a specific direction is applied when a contact list including address book items is displayed, the controller 180 can scroll the list. Furthermore, when a preset type of touch facing the specific direction is reapplied when the last item of the list is displayed on the touch screen 151, the controller 180 can display guide information as illustrated in FIG. 3(*c*). In addition, target information may be a contact list, schedule, etc.

Further, the screen information may correspond to general information. As described above, when the preset type of touch for moving screen information displayed on the touch screen 151 is applied when screen information corresponding to the last portion of target information is displayed on the touch screen 151, the controller 180 can display guide information for performing an authentication process associated with the display of security set information (S230).

More specifically, when target information to be displayed on the touch screen 151 does not exist along a touch direction of the preset type of touch, the controller 180 displays guide information 310 for performing an authentication process associated with displaying security set information as illustrated in FIG. 3(*c*). For example, assume arbitrary screen information is displayed on the touch screen 151, and the screen information can move in a first direction or second direction opposite to the first direction. In addition, the first direction faces a start portion of target information based on currently displayed screen information, and the second direction faces the last portion of target information based on currently displayed screen information.

In this instance, the controller 180 moves the arbitrary screen information according to a preset type of touch along the second direction, and displays target information on the touch screen 151 in response to the touch. Furthermore, when target information to be displayed on the touch screen 151 does not exist according to the preset type of touch along the second direction, the controller 180 can display the guide information 310. In other words, when target information to be displayed no longer exists according to the preset type of touch applied to the touch screen 151, the controller 180 can display the guide information 310.

In another example, when a preset type of touch along the first direction is applied and a start portion of target information is displayed on the touch screen 151, the controller 180 can display the guide information 310. In other words, since currently displayed screen information 151 is a start portion of display target information, information that is movable in the first direction does not exist even though the preset type of touch is applied toward the first direction facing the start direction based on currently displayed screen information.

In addition, as information for guiding an authentication process that should be performed to display security set information, guide information may include information indicating the existence of security set information, or an authentication process should be performed to display security set information for the user. Moreover, the present disclosure can perform an authentication process through the guide information.

Thus, the present disclosure can perform an authentication process based on authentication information received subsequent to displaying guide information or authentication information received while displaying guide information or authentication information received prior to displaying guide information, and display security set information when authentication is completed.

Further, the controller 180 can display guide information only when security set information exists in connection with a function corresponding to currently displayed screen information or when there exists security set information that is displayable in a current terminal status. In another example, even though security set information does not exist, the controller 180 can display the guide information to guide a process of converting information for which security is not set into security set information.

In addition, when the controller 180 only displays general information on the display unit 151 may be referred to as the terminal is in a "general mode," and a when an authentication process is successfully performed to display security set information on the terminal may be referred to as the terminal is in a "security mode." Further, the security mode is a mobile terminal operation mode in which an access to security set information is allowed, and the general mode is a mobile terminal operation mode in which an access to security set information is limited.

In the security mode, the user can not additionally perform an authentication process to display security set information. In other words, the display of security set information may be performed only when there is selection for information. Furthermore, in the general mode, the user can access security set information only when an authentication process (for example, fingerprint recognition, password input, etc.) is performed to display security set information.

As described above, a mobile terminal according to an embodiment of the present disclosure can perform different control operations according to circumstances with the same type of touch in connection with a control command for displaying the guide information only in a specific case (for example, when information corresponding to the last portion of target information is displayed) to a preset type of touch linked with a control command for moving screen information.

Hereinafter, a method of displaying security set information, and the authentication process is successfully performed will be described in more detail with reference to the accompanying drawings. In particular, FIGS. 4A, 4B and 4C are conceptual views illustrating a method of displaying security set information in a mobile terminal according to an embodiment of the present disclosure.

Figure 4A:
FIGS. 4A(a) to 4A(c), 4B and 4C are conceptual views illustrating a method of displaying security set information in a mobile terminal according to an embodiment of the present disclosure.
Figure 4A:
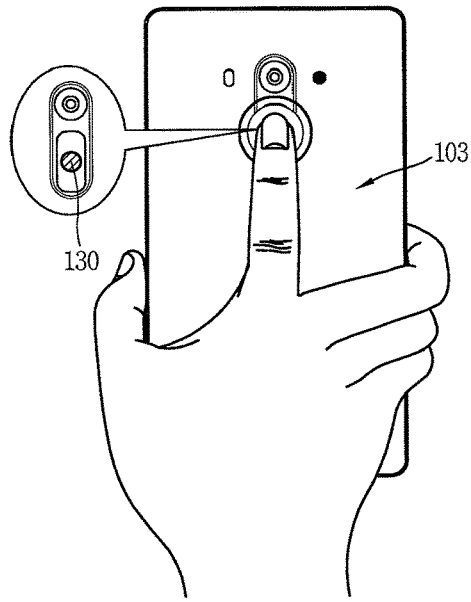
Figure 4A:
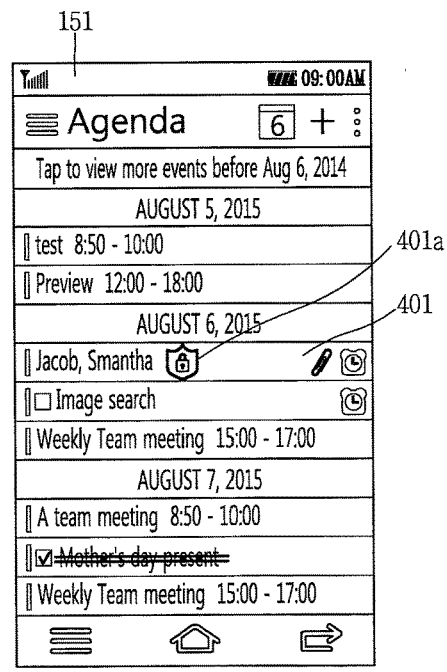

In more detail, the controller 180 displays security set information 401 as illustrated in FIG. 4A(c) when an authentication process is completed through an authentication mode as illustrated in FIG. 4A(b) and when guide information 310 is displayed as illustrated in FIG. 4A(a). The authentication mode illustrated in FIG. 4A(b) corresponds to one example, and various authentication modes other than a fingerprint recognition mode are applicable. In other words, the authentication mode authenticates a user to access the security set information.

Further, the security set information can be displayed along with general information, and sequentially displayed based on the order in which the general information and security set information are arranged as illustrated in FIG. 4A(c). In addition, the controller 180 can display a graphic object, an indicator or icon 401a indicating that the relevant information is security set information in a region displayed with the security set information or adjacent to the region to indicate the security set information as illustrated in FIG. 4A(c).

Figure 4B:
Figure 4C:
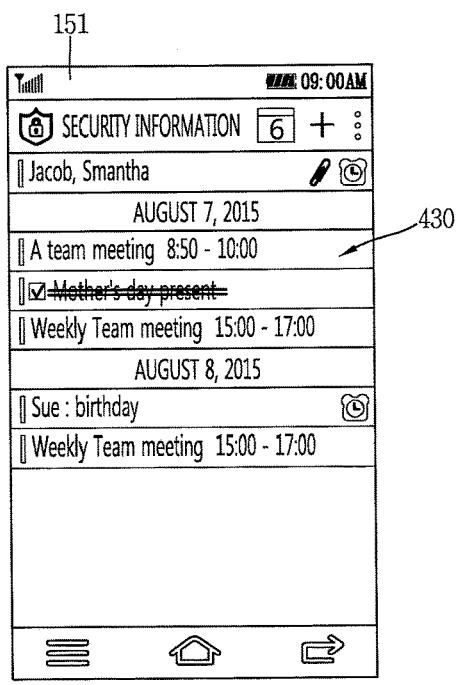

In another example, as illustrated in FIG. 4B, the controller 180 can divide the touch screen 151 into a plurality of regions and display the general information in one region 410, and display the security set information in another region 420. In still another example, as illustrated in FIG. 4C, when an authentication process is completed, the controller 180 can display only the security set information on the touch screen 151. In this instance, the general information previously displayed on the touch screen 151 is no longer displayed. In other words, the controller 180 can display a new page 430 including only security set information on the touch screen 151.

Further, the general information may be displayed again on the touch screen 151 when the display of the security set information ends or when the security is released. The end of the display of the security set information can be performed based on a user's selection. Moreover, a security release process for ending the display of the security set information can also be performed based on the user's selection. In addition, a method of displaying the security set information may be modified in various ways, and the present disclosure is not limited to the above example.

As described above, when target or additional information to be displayed on the touch screen in response to the preset type of touch in a specific touch direction does not exist, the controller 180 performs a process of guiding the display of security set information, and displays security set information in various ways upon a successful authentication of a user.

Hereinafter, an example in which different security set information is displayed according to a current status of the terminal or a function currently being executed in the terminal will be described in more detail with reference to the accompanying drawings. In particular, FIGS. 5A and 5B are conceptual views illustrating examples in which security set information is displayed in a mobile terminal according to an embodiment of the present disclosure.

In more detail, the controller 180 displays security set information based on a type of screen information currently displayed on the touch screen 151 or a function corresponding to screen information currently displayed on the touch screen 151. In other words, there may exist countless security set information corresponding to different types such as different categories or different applications, and the like. In addition, if security set information is indiscreetly provided to the user when the authentication process is completed, the user may be confused. Accordingly, the controller 180 selectively provides security set information currently required for a user among a plurality of security set information stored in the terminal according to the user's needs.

Further, a criteria for selecting security set information for the user can be a type of screen information displayed on the screen information, a function corresponding to the screen information, a type of application corresponding to the screen information, etc. For example, when a user authentication process is completed through a preset user authentication mode as illustrated in FIGS. 5A(b) and 5A(c) and when the execution screen of a specific application (for example, gallery application) is displayed as illustrated in FIG. 5A(a), the controller 180 can display security set information 510 associated with the specific application as illustrated in FIG. 5A(d). In this instance, the controller 180 can display displayable or accessible security set information through a specific application among security set information stored in the terminal.

Figure 5A:
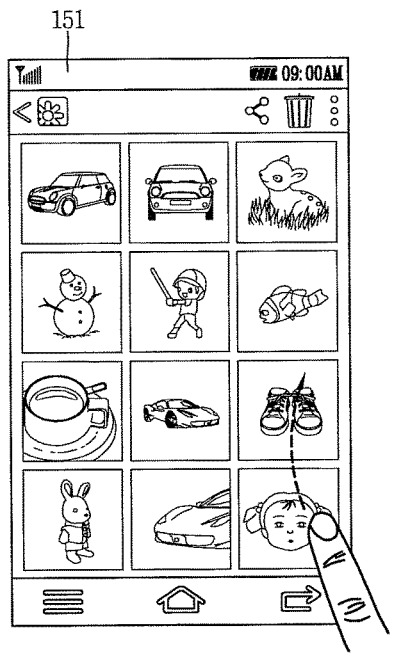
FIGS. 5A(a) to 5B(d) are conceptual views illustrating examples in which security set information is displayed in a mobile terminal according to an embodiment of the present disclosure.
Figure 5A:
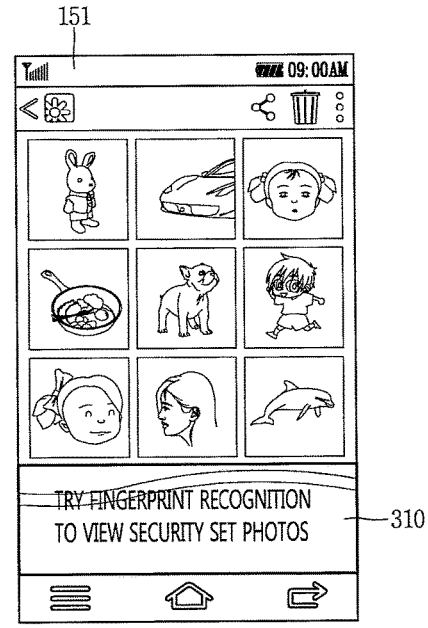
Figure 5A:
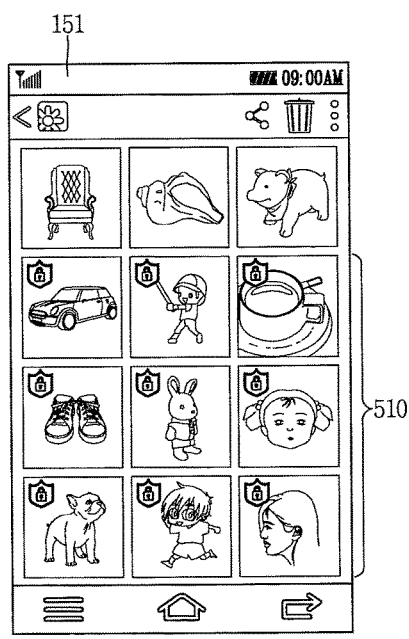
Figure 5A:
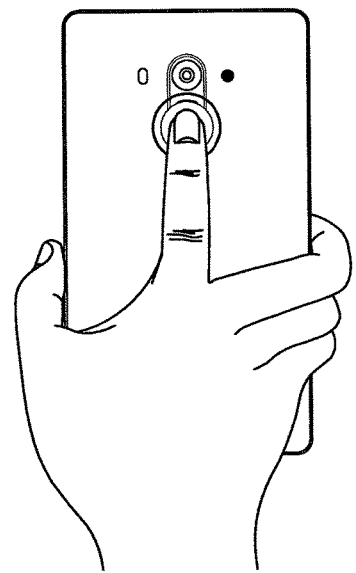
Figure 5B:
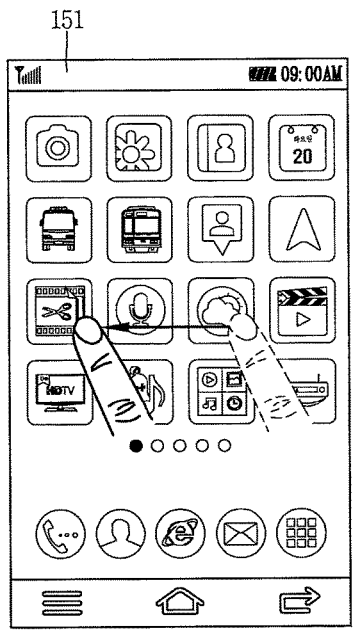
Figure 5B:
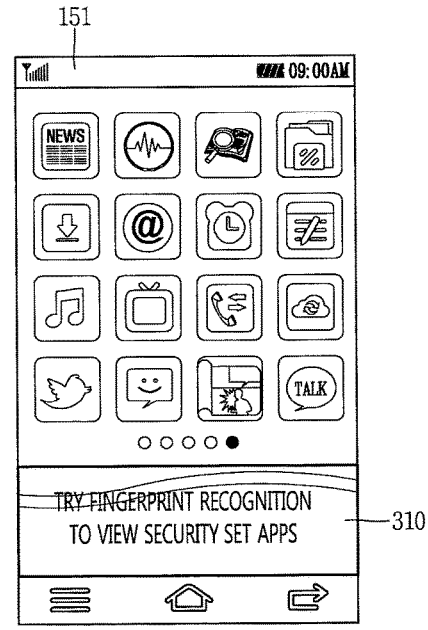
Figure 5B:
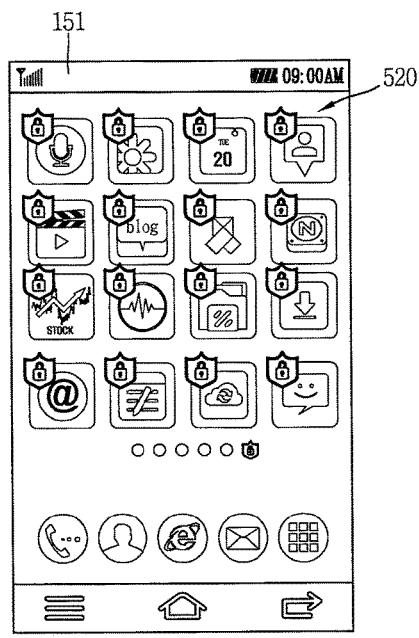
Figure 5B:
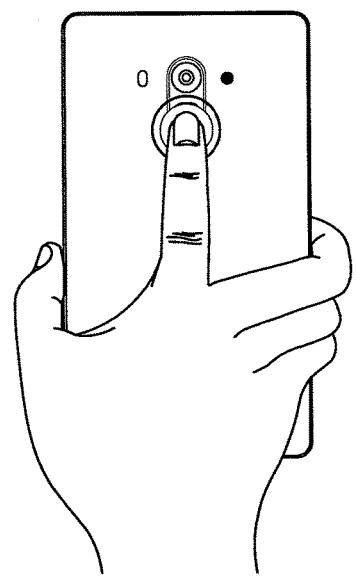

More specifically, the controller 180 can display a security set image, photo or video information 510 as illustrated in FIG. 5A(d). In addition, the security set image, photo or video may be also expressed as a hidden image (or concealed image), hidden photo (or concealed photo) or hidden video (or concealed video). Also, when the execution screen of a memo-related application is displayed on the touch screen, the controller 180 can display a security set memo.

In another example, when the last home screen page among a plurality of home screen pages is displayed according to a preset type of touch in one direction as illustrated in FIGS. 5B(a) and 5B(b) and the touch in one direction is continuously applied, the controller 180 can display the guide information 310. Furthermore, when a user is authenticated as illustrated in FIG. 5B(c), the controller 180 can display an icon of security set application as illustrated in FIG. 5B(d).

In addition, as shown in FIG. 5B(d), the controller 180 can display an additional home screen page 520 to include the icon of a security set application on the home screen page 520. In other words, the additional home screen page 520 is not displayed in a general mode, but is displayed only in a security mode. Further, any one of the foregoing methods described above in FIGS. 4A to 4C may be applicable to displaying security set information in the examples, and may be also performed in other various ways.

As described above, the mobile terminal according to an embodiment of the present disclosure can display security set information in connection with screen information currently displayed on the mobile terminal or a function corresponding to screen information, thereby satisfying the user's needs.

Hereinafter, a method of authenticating a user to access security set information to display the security set information will be described in more detail with reference to the accompanying drawings. In particular, FIGS. 6A to 9 are conceptual views illustrating a security mode in a mobile terminal according to an embodiment of the present disclosure. The mobile terminal can perform an authentication process to display security set information, and the authentication process may be performed through any one of various authentication modes.

For example, as illustrated above in FIG. 4A(b), a mobile terminal according to an embodiment of the present disclosure can further include a fingerprint recognition sensor. The fingerprint recognition sensor may be disposed at the user input unit 130 provided on the rear surface 103 of the terminal as illustrated in the drawing. Further, the user input unit 130 may be formed with a touch sensor overlapping with the fingerprint recognition sensor. In another example, the user input unit 130 may be a push key (or hardware key or physical key) disposed to overlap with the fingerprint recognition sensor. In still another example, the user input unit 130 may be a push key disposed with the touch sensor and the fingerprint recognition sensor.

When the guide information 310 is displayed, and a finger in contact with the fingerprint recognition sensor is identical to (or corresponds to) a user's fingerprint information that is accessible to security set information, the controller 180 can display the security set information. Meanwhile, the time point at which a fingerprint is recognized through the guide information and fingerprint recognition sensor is not restricted to its sequential relationship.

In another example, the fingerprint recognition sensor may be formed on the touch screen 151. For example, the fingerprint recognition sensor may be disposed to overlap with at least part of the touch screen 151. In a different example, the fingerprint recognition sensor may be provided within the touch screen 151. Further, the controller 180 can recognize a user's finger in touch with the touch screen 151, namely, a user's fingerprint in touch with the touch screen 151, through the touch screen 151.

Figure 6A:
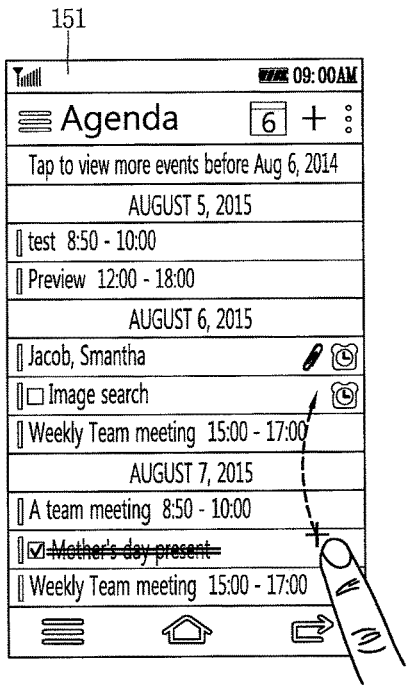
FIGS. 6A(a) to 9(b) are conceptual views illustrating a security mode in a mobile terminal according to an embodiment of the present disclosure.
Figure 6A:
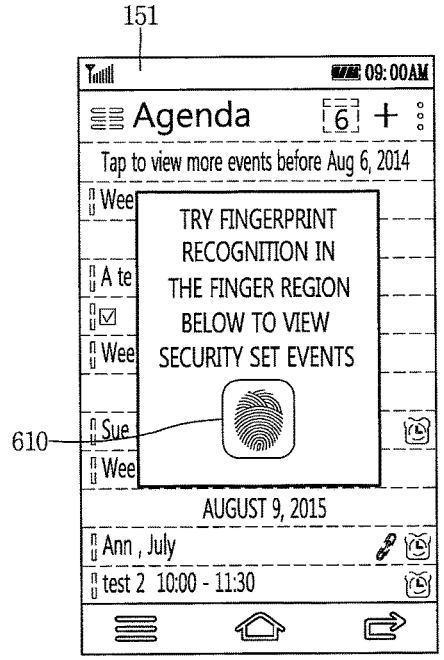

In this instance, the controller 180 can display a graphic object 610 indicating a region disposed with a fingerprint recognition sensor as illustrated in FIG. 6A(b). In other words, a user can recognize a region to which he or she should make a touch for fingerprint recognition through the graphic object 610. FIG. 6A(a) illustrates the preset type of touch applied while the last part of the screen information is displayed.

Further, even when the fingerprint recognition sensor is disposed in a different region other than a region displayed with the graphic object 610, and a fingerprint is recognized in the different region other than the graphic object 610, the controller 180 does not use it as authentication information. In other words, only when a fingerprint is recognized with respect to a preset region does the controller 180 use it as authentication information for performing the authentication process. This makes sure of the user's intention to use the security set information is sure.

In another example, the fingerprint recognition sensor can be located on a front surface of the terminal. For example, the fingerprint recognition sensor can be disposed on the user input unit 130 provided on a front surface of the terminal as illustrated in the drawing. In addition, the user input unit 130 may be referred to as a "home key." In this instance, the home key includes a touch sensor overlapping with the fingerprint recognition sensor. In another example, the home key may be a push key (or hardware key or physical key) disposed to overlap with the fingerprint recognition sensor. Furthermore, the home key may be a push key disposed along with the touch sensor and the fingerprint recognition sensor.

Figure 6B:
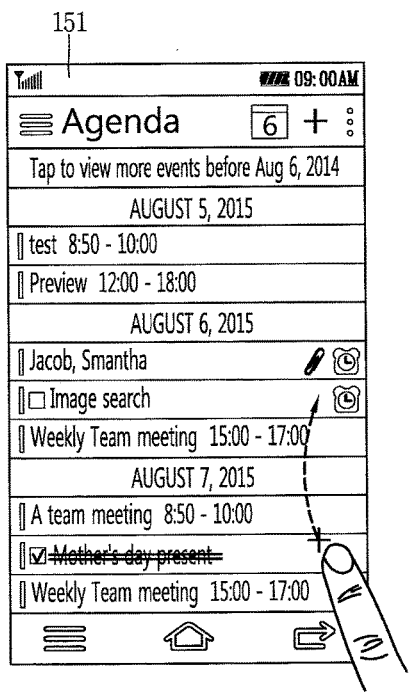
Figure 6B:
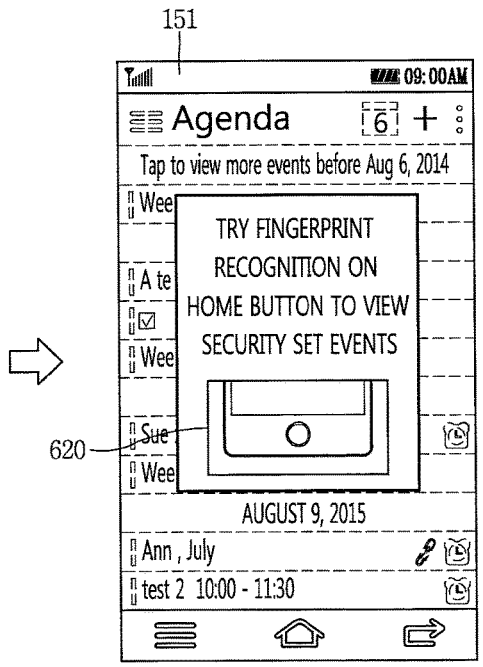

In addition, the controller 180 can include guide information on a location with which a finger should be contacted in order to perform fingerprint recognition as illustrated in FIG. 6B(b). FIG. 6B(a) illustrates the preset type of touch applied while the last part of the screen information is displayed. Further, when an authentication process is performed through a fingerprint recognition mode, the controller 180 can display security set information only while recognizing a user's fingerprint that is accessible to the security set information. In other words, in this instance, when the preset user's finger contact is released from the fingerprint recognition sensor, the display of security set information may be stopped.

On the contrary, when the authentication process is completed, the controller 180 can continuously display security set information even though the preset user's finger contact is released from the fingerprint recognition sensor. Further, a mobile terminal according to an embodiment of the present disclosure can perform an authentication process based on authentication information received from a user. In addition, authentication information may be preset password information, PIN code information, and the like.

Figure 7A:
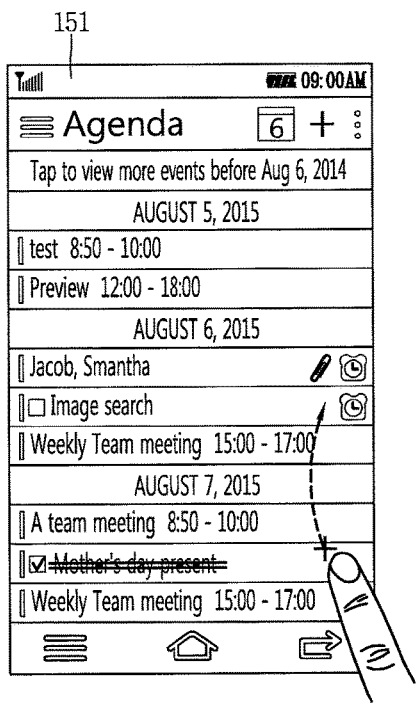
Figure 7A:
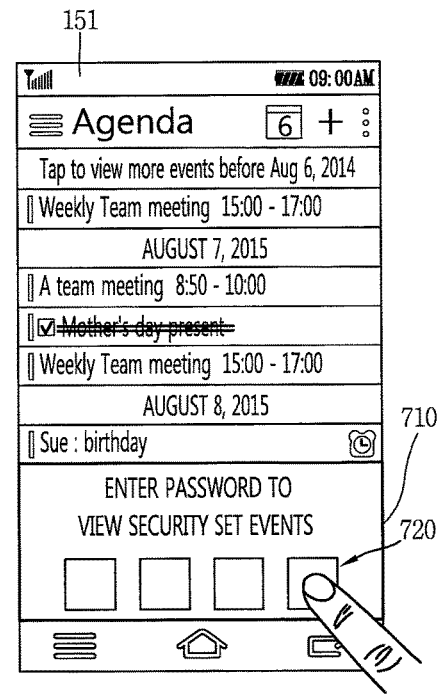
Figure 7A:
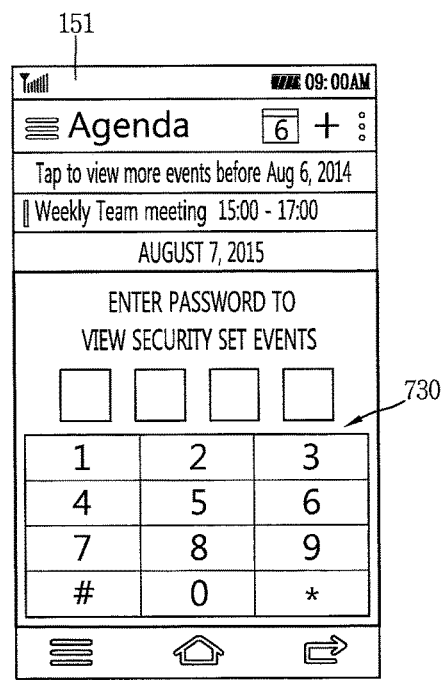

For example, as illustrated in FIGS. 7A(a) and 7A(b), the controller 180 can display guide information 710 for guiding the display of security set information in response to a preset type of touch applied in one direction. In addition, the controller 180 can additionally display an input region 720 for receiving authentication information. As shown in FIG. 7A(c), the controller 180 can also additionally display a keypad 730 on the touch screen 151 to receive authentication information. A password or PIN code received through the keypad 730 can then be input in the input region 720.

Figure 7B:
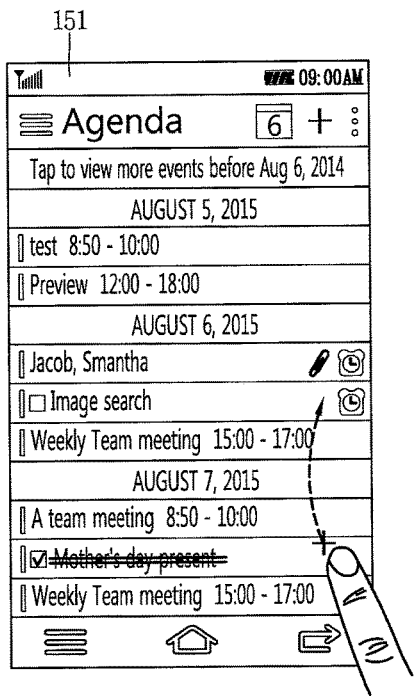
Figure 7B:
Figure 7B:
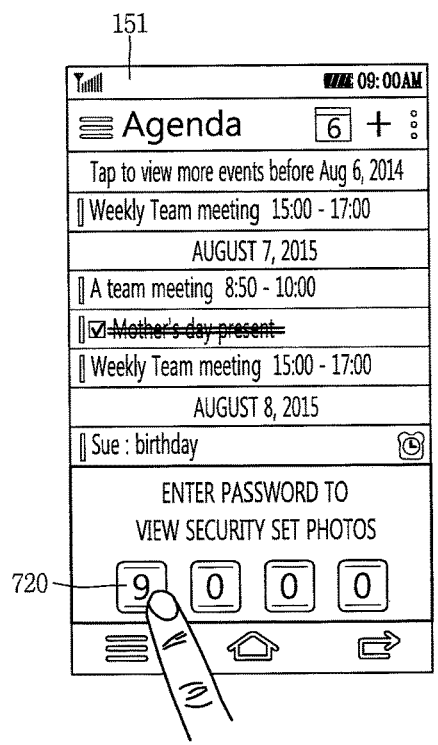

Further, the password or PIN code may be received through a touch to the input region 720 itself as illustrated in FIGS. 7B(a) to 7B(c). An arbitrary number or text is entered to the input region 720, and such a number or text may be changed based on a touch to the input region 720. When a number displayed on the input region 720 corresponds to preset authentication information, the controller 180 can determine that an authentication process has been successfully completed.

Figure 7C:
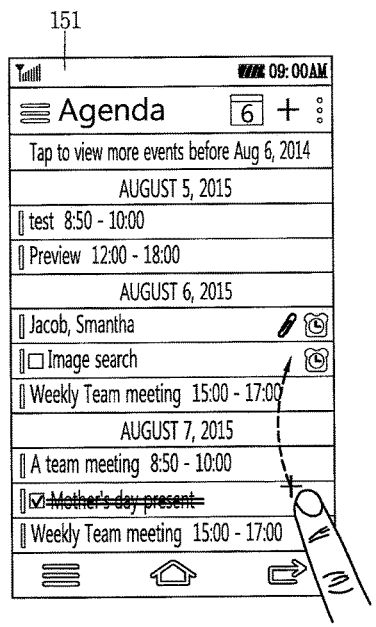
Figure 7C:
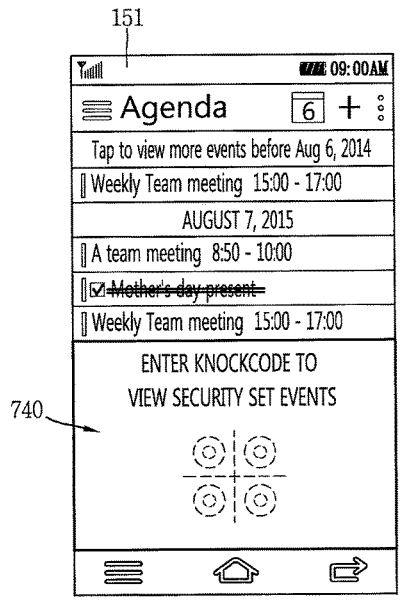

In another example, the authentication information may include a touch pattern (or knock code) defined by a plurality of tap touches. As illustrated in FIGS. 7C(a) and 7C(b), when a preset touch pattern is applied to a touch region 740, the controller 180 can determine that the authentication process has been successfully completed. The touch pattern may be defined by a touch count and a relative location between consecutive touches.

Figure 8A:
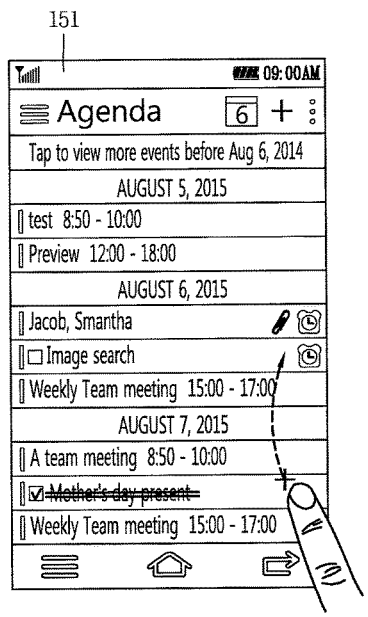
Figure 8B:
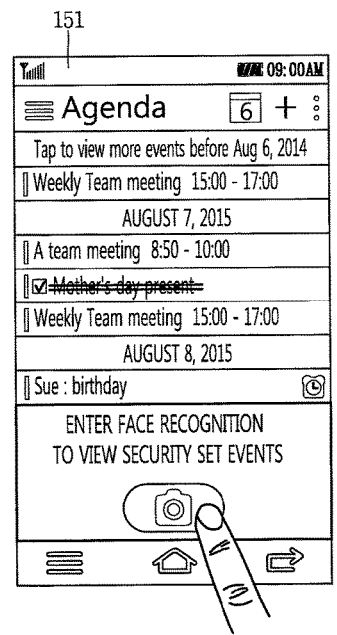

In another example, as illustrated in FIGS. 8(a) and 8(b), the controller 180 can authenticate a user allowed to access security set information through a face recognition mode. Also, an authentication process for authenticating a user allowed to access security set information may be performed through various authentication modes such as voice recognition, iris recognition, eye recognition, and the like.

Figure 9A:
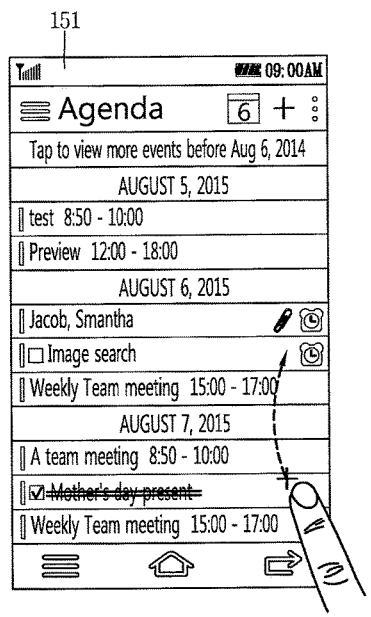
Figure 9B:
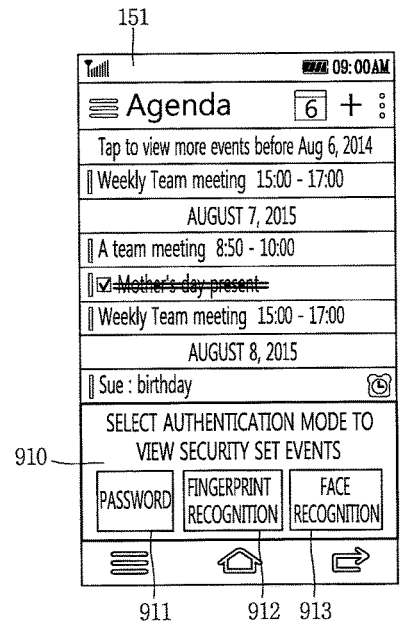

Further, whether or not to authenticate a user allowed to access security set information through various authentication modes may be determined by the user's selection. Moreover, when guide information 910 is displayed as illustrated in FIGS. 9(a) and 9(b), the controller 180 can display a plurality of graphic objects 911, 912, 913 corresponding to different authentication methods, respectively, to allow a user to select an authentication mode prior to performing an authentication process. Then, the controller 180 can perform a different authentication process according to which one of the plurality of graphic objects 911, 912, 913 is selected.

Hereinafter, a method of ending the display of security set information will be described in more detail with reference to the accompanying drawings. In particular, FIGS. 10A, 10B and 10C are conceptual views illustrating a method of ending the display of security set information in a mobile terminal according to an embodiment of the present disclosure.

As described above, when security set information is displayed through an authentication process, the display of the security set information may be stopped based on the user's selection or the control of the controller 180. In this instance, the display of security set information may be stopped and general information may be displayed on the touch screen 151.

For example, the controller 180 can stop displaying the security set information when a preset period of time has passed subsequent to displaying the security set information. In another example, when a touch is not applied to the touch screen 151 for a preset period of time subsequent to displaying security set information, the controller 180 can stop displaying the security set information. In still another example, when the touch screen is switched to an off state due to the user's selection or the passage of a preset period of time subsequent to displaying security set information, the controller 180 can stop displaying the security set information. Further, even when the touch screen is turned on again, the security set information may be no longer displayed.

Figure 10A:
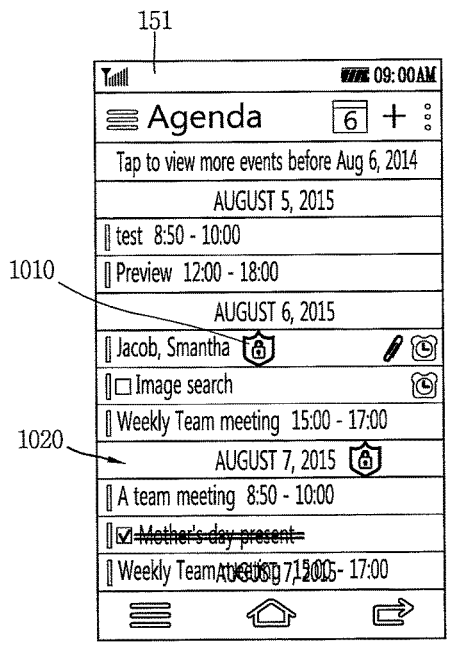
FIGS. 10A(a) to 10C(b) are conceptual views illustrating a method of ending the display of security set information in a mobile terminal according to an embodiment of the present disclosure.
Figure 10A:
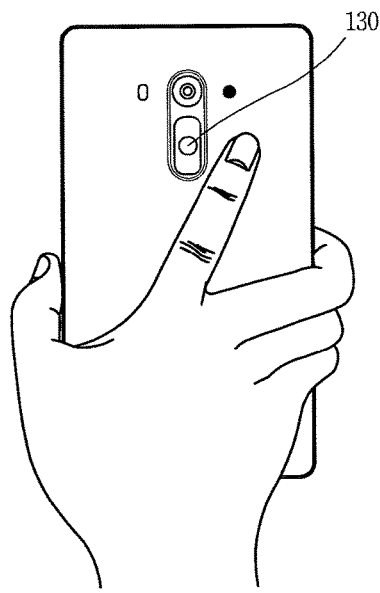
Figure 10A:
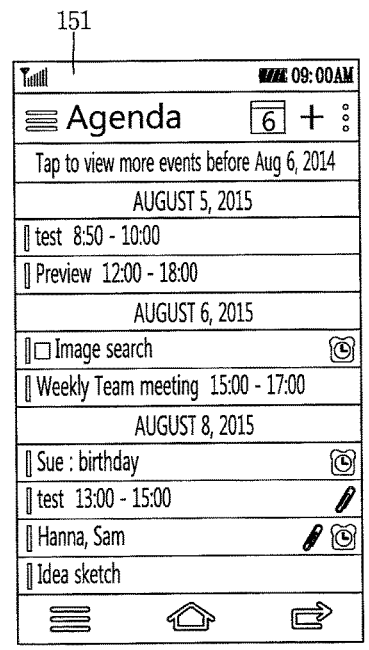
Figure 10B:
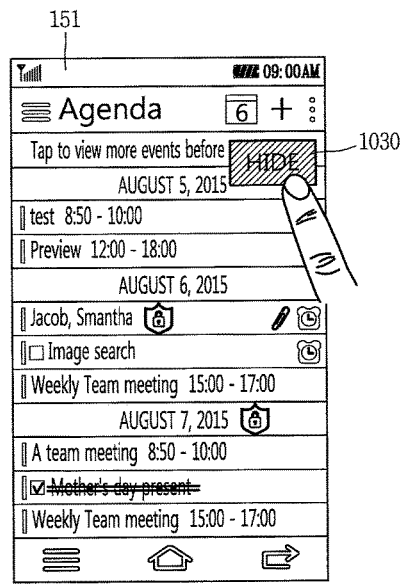
Figure 10B:
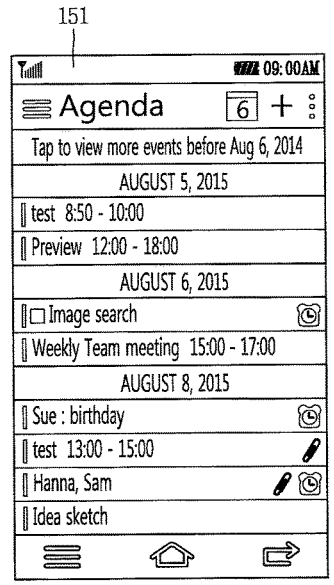
Figure 10C:
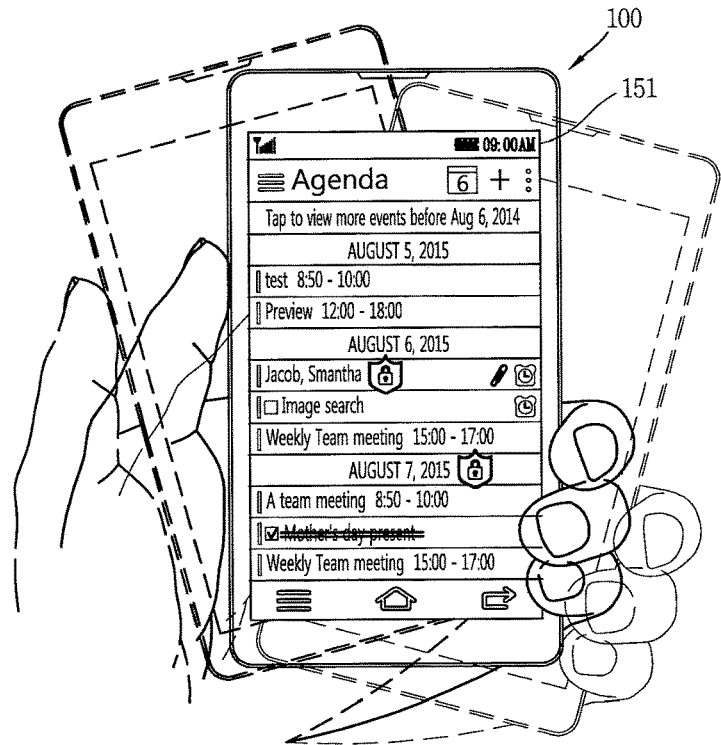
Figure 10C:
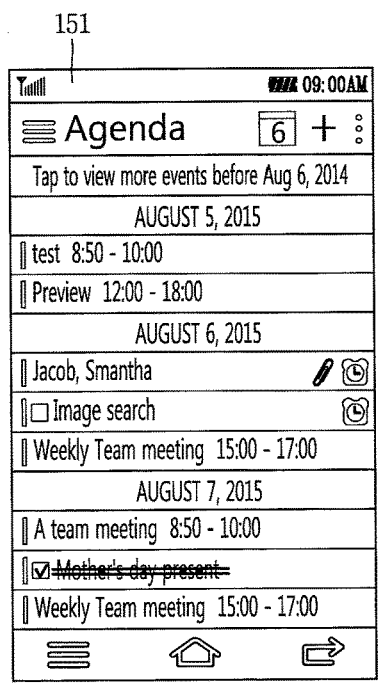

In another example, when a user allowed to access security set information is authenticated through a fingerprint recognition mode, the controller 180 can stop displaying the security set information when the user's fingerprint is no longer sensed on the fingerprint recognition sensor 130 as illustrated in FIG. 10A(b). In other words, the controller 180 can control the terminal to operate in a security mode only when a fingerprint is recognized, and control the terminal to operate in a general mode when the fingerprint recognition is ended, namely, a finger contact with the user input unit 130 is released.

Accordingly, as illustrated in FIGS. 10A(a) to 10A(c), the display of security set information 1010, 1020 may be stopped when the user's fingerprint is no longer sensed on the user input unit 130. In another example, as illustrated in FIGS. 10B(a) and 10B(b), the controller 180 can display an icon 1030 to stop displaying the security set information on the touch screen 151 while displaying the security set information. In this instance, the controller 180 can stop displaying the security set information as illustrated in FIG. 10B(b) based on the icon 1030 being selected in FIG. 10B(a).

In still another example, when the terminal body 100 is swung, rotated, impacted, inclined, etc., a preset reference as illustrated in FIG. 10C(a) or when an output above a preset reference value is applied to the terminal body 100, the controller 180 can stop displaying the security set information as illustrated in FIG. 10C(b). In addition, the swing, rotation, impact or inclination of the terminal can be sensed through a sensor provided in the terminal, and for example, can be sensed through an acceleration sensor, motion sensor, or the like. Furthermore, of the controller 180 can stop displaying the security set information through various modes in addition to the foregoing modes, and the present disclosure is not limited to the foregoing examples.

Hereinafter, a method of notifying the existence of security set information or providing guide information on this when security set information does not exist will be described in more detail with reference to the accompanying drawings. In particular, FIGS. 11 to 13 are conceptual views illustrating a method of displaying guide information for security set information in a mobile terminal according to an embodiment of the present disclosure.

As described above, when a preset type of touch is applied in one direction and additional target information does not exist, the controller 180 displays guide information associated with the display of security set information. In this instance, a user can recognize the existence of security set information only when screen information displayed on the touch screen 151 corresponds to the last portion of display target information.

Figure 11A:
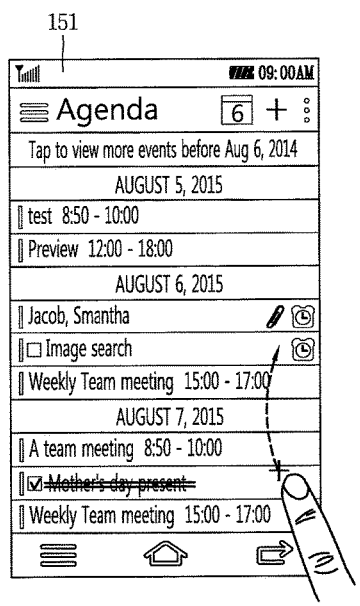
FIGS. 11(a) to 12(c) are conceptual views illustrating a method of displaying guide information for security set information in a mobile terminal according to an embodiment of the present disclosure.
Figure 11B:
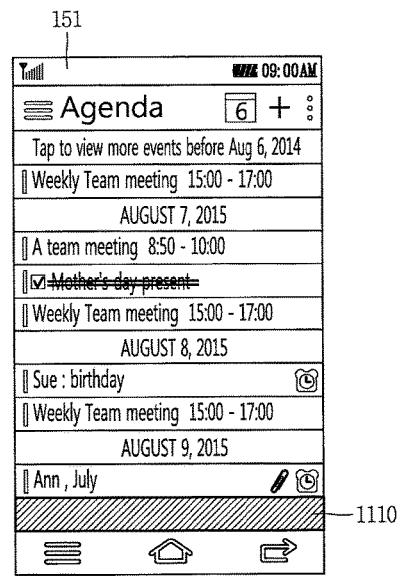

Accordingly, an embodiment of the present disclosure provides a graphic user interface for notifying that there is security set information to the user regardless of which portion of target information corresponds to screen information currently displayed on the touch screen 151. For example, when screen information displayed on the touch screen 151 moves in response to the preset type of touch as illustrated in FIG. 11(a), the controller 180 can display an indicator 1110 indicating that there is security set information as illustrated in FIG. 11(b).

In other words, the controller 180 can display an indicator 1110 indicating that there is security set information associated with currently displayed screen information or security set information provided through a currently executed application. Accordingly, the user can recognize that there is security set information associated with currently displayed screen information or security set information provided through a currently executed application through the indicator 1110.

Further, the indicator 1110 may be displayed only while screen information displayed on the touch screen 151 is moving in response to the preset type of touch, and may not be displayed when the screen information stops moving. In another example, the indicator 1110 can be continuously displayed on the touch screen 151 only when there exists security set information associated with currently displayed screen information or security set information provided through a currently executed application.

Figure 12A:

Further, when there is no security set information associated with currently displayed screen information or security set information provided through a currently executed application, the controller 180 can display guide information indicating security is set to general information. For example, when there is not a preset type of touch in one direction, the controller 180 can display guide information 1210 indicating security is set to general information as illustrated in FIG. 12(a). In other words, in this instance, the controller 180 can set at least part of currently displayed screen information or at least part of content provided through a currently executed application to security information based on the user's selection.

Figure 12B:
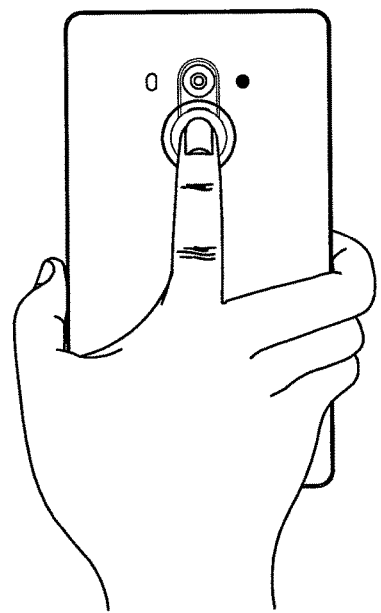
Figure 12C:
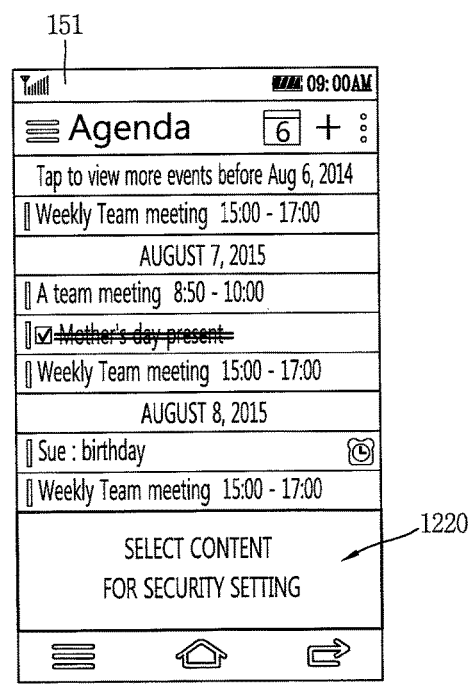

For example, when authentication for a user allowed to access security set information is completed as illustrated in FIG. 12(b), the controller 180 can select information (or content) desired to be set to security as illustrated in FIG. 12(c). For example, the selection of information desired to be set to security can be performed by dragging a touch started from a region displayed with information desired to be set to security to a preset region 1220. In another example, the selection of information desired to be set to security can be performed based on a preset type of touch to a region displayed with information desired to be set to security. Various modified examples exist for a security setting mode for information (or content).

Hereinafter, a method of releasing security for security set information or a method of setting security for general information will be described in more detail with reference to the accompanying drawings. In particular, FIGS. 13-15 are conceptual views illustrating a method of setting or releasing security for information in a mobile terminal according to an embodiment of the present disclosure.

In this embodiment, the controller 180 can release security for security set information based on a user's selection. In other words, when the security for security set information is released, the released information may correspond to general information, and be displayed on the touch screen.

Figure 13A:
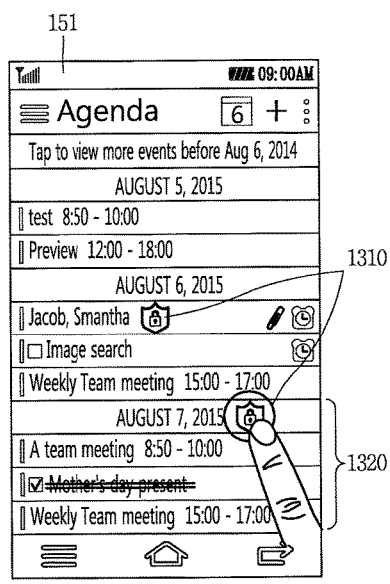
FIGS. 13(a) to 15B(b) are conceptual views illustrating a method of setting or releasing security for information in a mobile terminal according to an embodiment of the present disclosure.
Figure 13B:
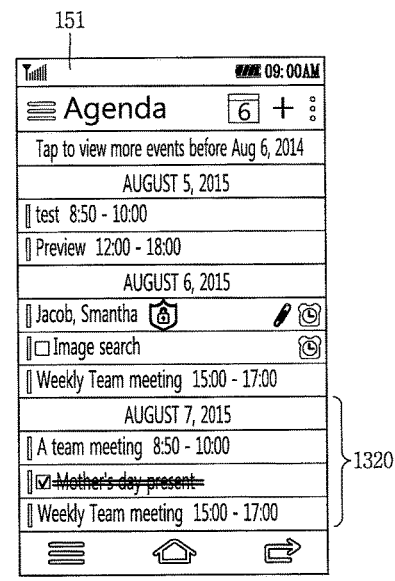

Various methods of releasing the security for security set information are possible, and as an example, when a user's finger allowed to access security set information is brought into contact with a graphic object 1310 indicating security set information, and the user's fingerprint is recognized (i.e., when a fingerprint corresponding to prestored user fingerprint information is recognized in response to a touch to the graphic object) as illustrated in FIG. 13(a), the controller 180 can release the security for information (or content 1320) corresponding to the graphic object 1310 as shown in FIG. 13(b).

Figure 14A:
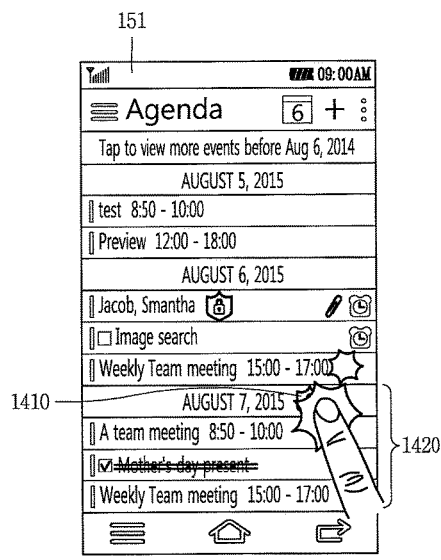
Figure 14B:
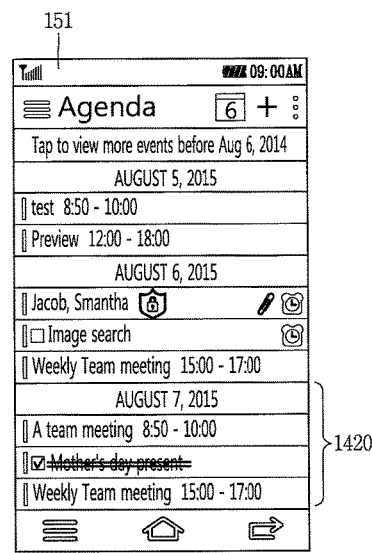

In addition, the graphic object 1310 can be displayed on regions displayed with security set information. In another example, when a preset type of touch is applied to a graphic object 1410 indicating security set information as illustrated in FIG. 14(a), the controller 180 can release security for information (or content 1420) corresponding to the graphic object 1410 as shown in FIG. 14(b).

In still another example, the controller 180 can release the security for security set information based on the security set information being moved to a preset region. For example, as illustrated in FIG. 15A(a), the touch screen 151 may include a first region 1510 containing screen information (general information) that has been displayed on the touch screen prior to displaying the security set information and a second region 1520 displayed with the security set information.

Figure 15A:
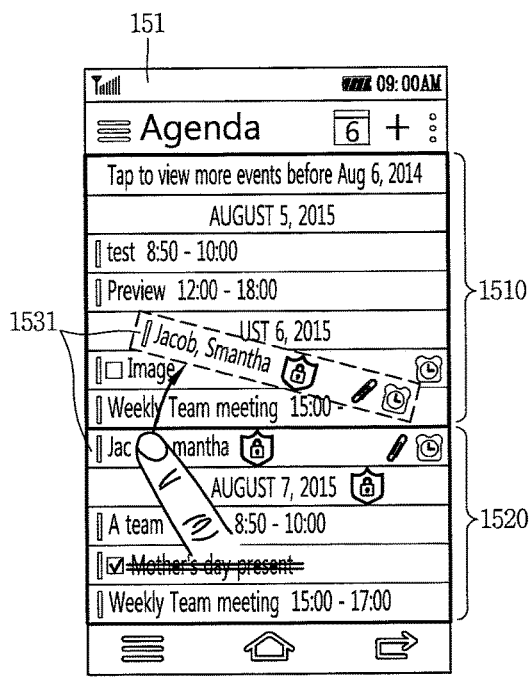
Figure 15A:
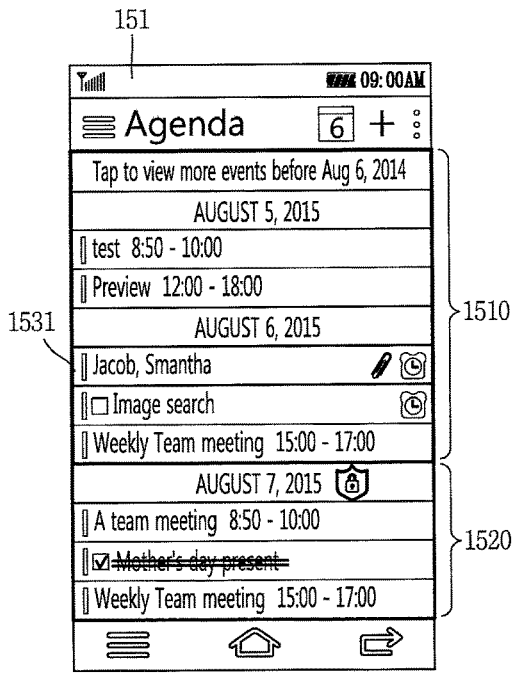

Furthermore, when at least part 1531 of security set information displayed on the second region 1520 moves into the first region 1510 displayed with general information, the controller 180 can release the security setting for the information 1531 moved into the first region 1510 based on a user's selection as shown in FIG. 15A(b). The controller 180 can also perform an authentication process for releasing security for the information 1531 in response to the application of a touch input for moving at least part of information displayed on the second region 1520 into the first region 1510. Furthermore, when the authentication process is completed, the information 1531 can be set to general information. The information 1531 may also be moved into the first region 1510 and displayed thereon.

Figure 15B:
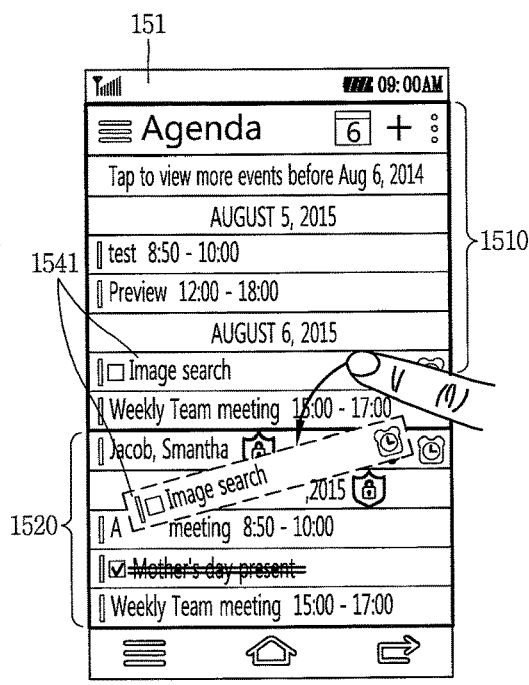
Figure 15B:
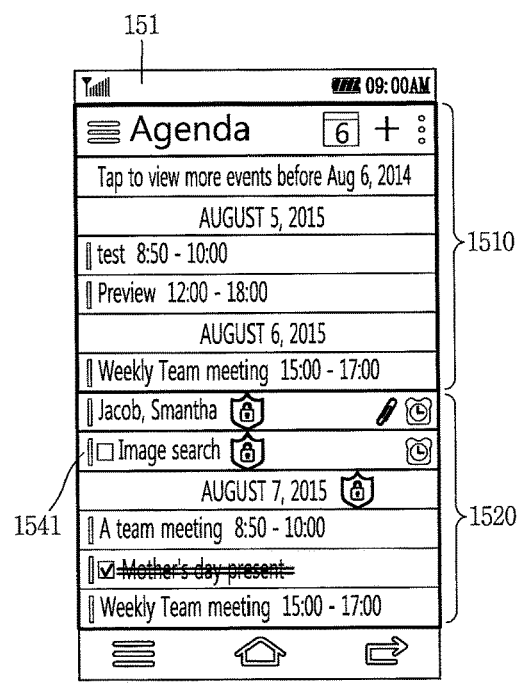

On the contrary, as illustrated in FIG. 15B(a), when at least part 1541 of general information displayed on the first region 1510 moves into the second region 1520 containing security set information based on a user's selection, the controller 180 can set security for the information 1541 that has been moved into the second region 1520 as illustrated in FIG. 15(b). The controller 180 can also perform an authentication process for setting the security for the information 1541. Furthermore, when the authentication process is completed, the information 1541 can be set to security set information. The information 1541 can also be moved into the second region 1520 and displayed thereon as shown in FIG. 15B(b).

As described above, according to a mobile terminal and a control method thereof in accordance with an embodiment of the present disclosure, a control command for scrolling screen information and a control command for displaying guide information for guiding the display of security set information can be defined together for a touch input for scrolling screen information, and thus a user can input only a gesture for scrolling currently displayed screen information to access security set information without entering an additional menu screen. Accordingly, the user can access security set information in a more convenient and intuitive manner.

Hereinafter, a method of guiding an access to security set information in a different mode from the foregoing method will be described in more detail with reference to the accompanying drawings. In particular, FIG. 16 is a flow chart illustrating a control method in a mobile terminal according to another embodiment, and FIG. 17 is a conceptual view illustrating the control method illustrated in FIG. 16.

Figure 17A:
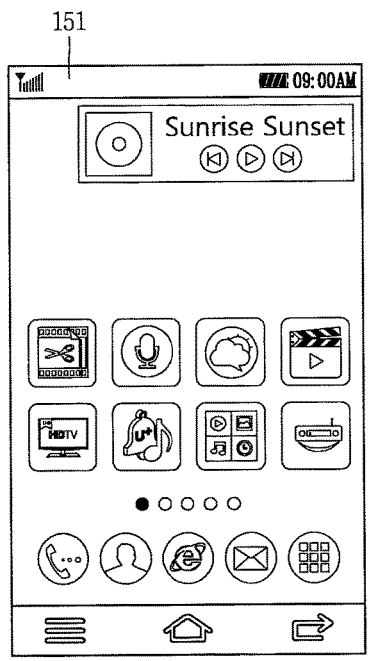
FIGS. 17(a) to 17(d) are conceptual views illustrating a control method illustrated in FIG. 16.
Figure 17B:
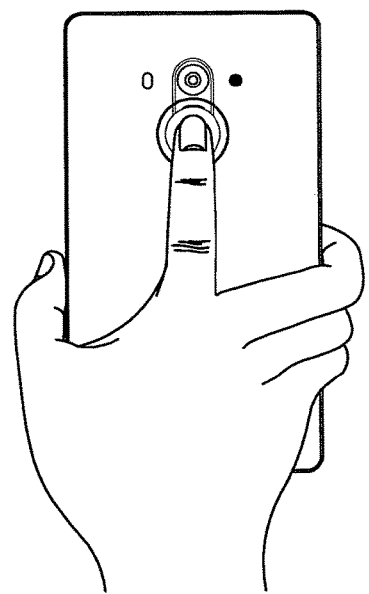
Figure 17D:
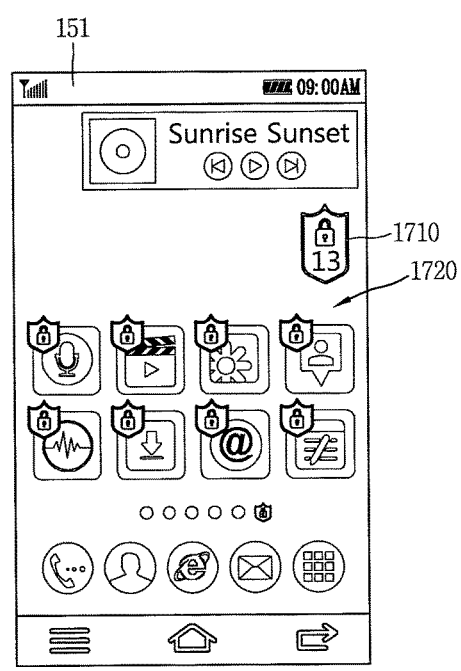
Figure 17C:
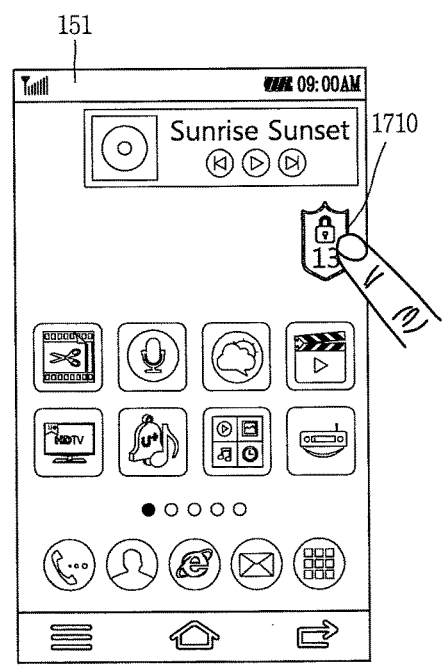

As shown in FIGS. 17(a) and 17(b), when a user's fingerprint is recognized through a fingerprint recognition sensor provided in the mobile terminal when screen information is displayed on the touch screen 151, the controller 180 displays a graphic object 1710 linked with a function associated with security as shown in FIG. 17(c). Furthermore, the present disclosure can perform various functions associated with security in response to a touch to a graphic object displayed thereon. In addition, the graphic object may be a widget or icon shape.

Figure 16:
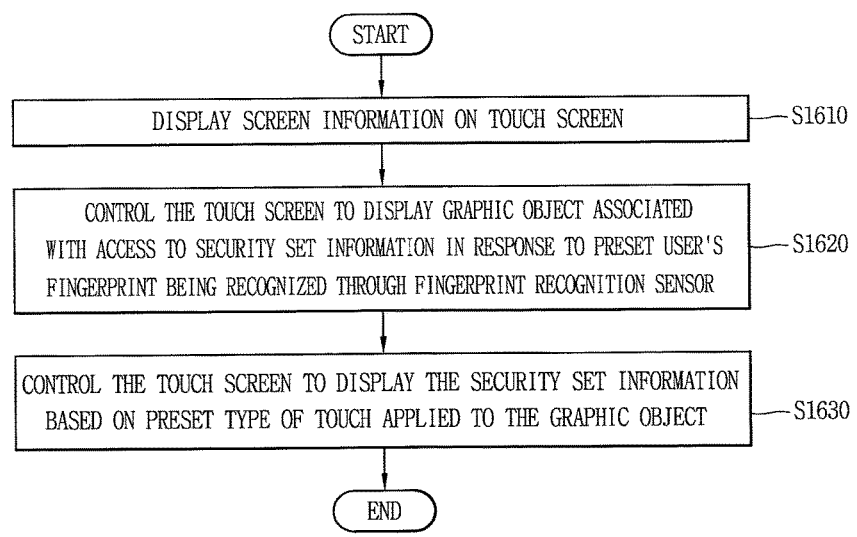
FIG. 16 is a flow chart illustrating a control method in a mobile terminal according to another embodiment of the present disclosure.

More specifically, as shown in FIG. 16, the controller 180 displays screen information on the display unit (S1610). In one embodiment, the type of displayed screen information is irrelevant, and the type of screen information can be determined according to which function or which application is currently being executed in the terminal.

For example, as illustrated in FIG. 17(a), a home screen page may be displayed on the touch screen 151. Then, referring again to FIG. 16, the controller 180 displays a graphic object associated with an access to security set information (S1620). For example, as illustrated in FIG. 17(b), when a fingerprint corresponding to preset user fingerprint information is recognized through a fingerprint recognition sensor, the controller 180 can display a graphic object 1710 as illustrated in FIG. 17(c).

The display location of the graphic object 1710 may be changed on the touch screen in response to a touch to the graphic object. In other words, the graphic object can move on the touch screen in response to a touch to the graphic object. Further, the graphic object may be displayed to overlap with screen information currently displayed on the touch screen. The mobile terminal can also operate in a security mode while the graphic object is displayed on the touch screen 151. In other words, an access to security set information is allowed while the graphic object 1710 is displayed on the touch screen.

Further, as shown in FIG. 17(c), the graphic object 1710 can include information on a number of security set information (or security set content). In more detail, the information corresponds to a number of security set information linked with currently displayed screen information. The information on the number may also correspond to a number of security set information provided through an application corresponding to currently displayed screen information. In other words, the number of security set information can vary depending on what screen information is displayed on the touch screen.

Further, the controller 180 displays the security set information based on a preset type of touch applied to the graphic object 1710 (S1630). For example, as illustrated in FIGS. 17(c) and 17(d), when a preset type of touch is applied to the graphic object 1710, the controller 180 can display security set information.

For example, when a preset type of touch is applied to the graphic object 1710 as illustrated in FIG. 17(c) when a home screen page is displayed on the touch screen 151, the controller 180 can display an icon of security set application as illustrated in FIG. 17(d). In addition, the controller 180 can display an additional home screen page 1720 including icons of security set application on the home screen page 1720. In other words, the additional home screen page 1720 is generally displayed in a general mode, but is displayed only in a security mode.

In addition, a preset type of touch to a graphic object may be a drag touch. Further, the graphic object 1710 may be displayed only while a user's finger allowed to access security set information is recognized through the fingerprint recognition sensor. In other words, when the user's finger contact is released on the fingerprint recognition sensor, the controller 180 stops displaying the graphic object 1710. In this instance, the terminal is switched from a security mode to a general mode.

In other words, when the preset user's finger contact is released on the fingerprint recognition sensor when security set information is displayed, the controller 180 can stop displaying the security set information. Further, as discussed above, a mobile terminal according to an embodiment of the present disclosure can further include a fingerprint recognition sensor disposed at the user input unit 130 provided on the rear surface 103 of the terminal.

As discussed above, the user input unit 130 can be formed with a touch sensor overlapping with the fingerprint recognition sensor. In another example, the user input unit 130 can be a push key (or hardware key or physical key) disposed to overlap with the fingerprint recognition sensor. In still another example, the user input unit 130 can be a push key disposed with the touch sensor and the fingerprint recognition sensor.

In another example, the fingerprint recognition sensor can be formed on the touch screen 151. For example, the fingerprint recognition sensor can be disposed to overlap with at least part of the touch screen 151. In a different example, the fingerprint recognition sensor can be provided within the touch screen 151. In this instance, the controller 180 can recognize a user's finger touching the touch screen 151, namely, a user's fingerprint through the touch screen 151.

In still another example, the fingerprint recognition sensor can be located on a front surface of the terminal. For example, the fingerprint recognition sensor can be disposed on the user input unit 130 provided on a front surface of the terminal. The user input unit 130 may also be referred to as a "home key." In particular, the home key can include a touch sensor overlapping with the fingerprint recognition sensor. In another example, the home key may be a push key (or hardware key or physical key) disposed to overlap with the fingerprint recognition sensor. Furthermore, the home key may be a push key disposed along with the touch sensor and the fingerprint recognition sensor. In addition, the fingerprint recognition sensor may be located on a lateral surface of the terminal, and provided with the foregoing configuration.

Further, when a preset user's fingerprint is merely recognized through the fingerprint recognition sensor when screen information is displayed on the touch screen, the controller 180 can display the graphic object 1710. In addition, the controller 180 can display the graphic object 1710 only when a preset user's finger contact is maintained on the fingerprint recognition sensor (i.e., when a fingerprint corresponding to a preset fingerprint information is recognized on the fingerprint recognition sensor for a preset period of time) in order to determine whether the user's finger contact to the fingerprint recognition sensor is the user's intention for displaying the graphic object 1710. Further, when there is no touch to the graphic object 1710 for a preset period of time, the controller 180 can stop displaying the graphic object 1710 on the touch screen 151. In this instance, a security mode is switched to a general mode.

Hereinafter, the type of security set information displayed based on a touch to a graphic object will be described in more detail with reference to the accompanying drawings. In particular, FIGS. 18 and 19 are conceptual views illustrating a type of security set information in a mobile terminal according to an embodiment of the present disclosure. That is, the mobile terminal displays security set information based on a type of screen information currently displayed on the touch screen 151 or a function corresponding to screen information currently displayed on the touch screen 151.

In other words, there exist countless security set information corresponding to different types such as different categories or different applications, and the like. In addition, if security set information is indiscreetly provided to a user when an authentication process is completed, the user may be confused. Accordingly, an embodiment of the present disclosure selectively provides security set information currently required for a user among a plurality of security set information stored in the terminal according to the user's needs.

Figure 18A:
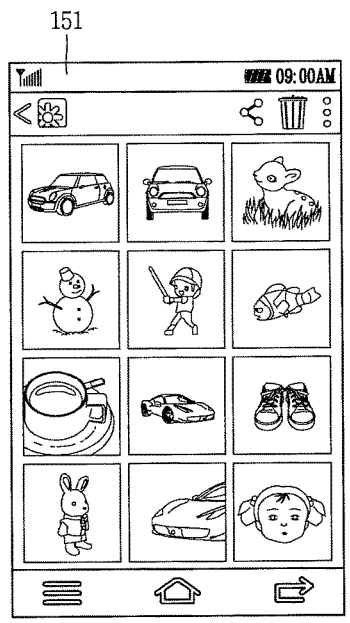
FIGS. 18(a) to 19(c) are conceptual views illustrating a type of security set information in a mobile terminal according to an embodiment of the present disclosure.
Figure 18B:
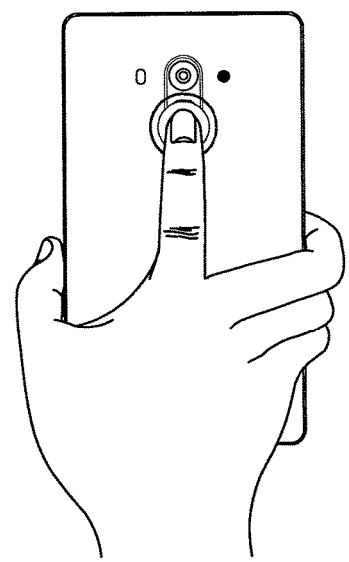

Further, a criteria for selecting security set information required for a user can be at least one of a type of screen information displayed on the screen information, a function corresponding to the screen information and a type of application corresponding to the screen information. For example, when a preset user's fingerprint is recognized through the fingerprint recognition sensor as illustrated in FIG. 18(b) when the execution screen of a specific application (for example, gallery application) is displayed as illustrated in FIG. 18(a), the controller 180 displays a graphic object 1810 as illustrated in FIG. 18(c). Furthermore, when a preset type of touch is applied to the graphic object 1810, the controller 180 can display security set information associated with the specific application. In this instance, the controller 180 can display displayable or accessible security set information through a specific application among security set information stored in the terminal.

Figure 18D:
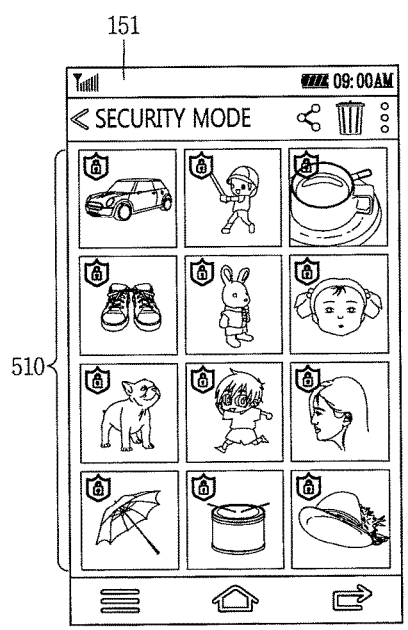
Figure 18C:
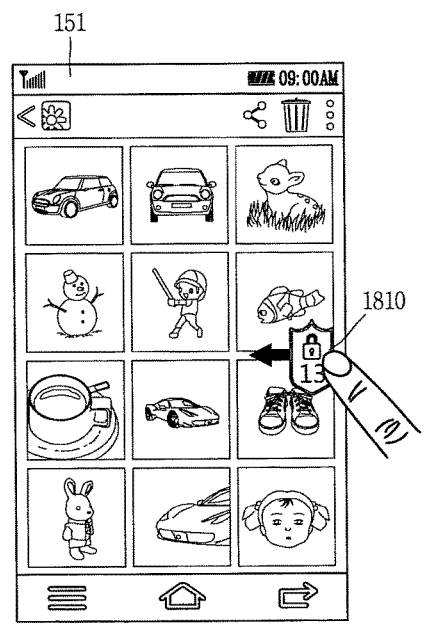

More specifically, the controller 180 can display a security set image, photo or video information 510 as illustrated in FIG. 18(d). In addition, the security set image, photo or video may be also expressed as a hidden image (or concealed image), hidden photo (or concealed photo) or hidden video (or concealed video). In addition, when the execution screen of a memo-related application is displayed on the touch screen, the controller 180 can display a security set memo.

As described above, the controller 180 can display first information for which security is set in connection with a first application in response to the preset type of touch to the graphic object when screen information displayed on the touch screen is an execution screen of the first application. Furthermore, the controller 180 can display second information for which security is set in connection with a second application in response to the preset type of touch to the graphic object when screen information displayed on the touch screen is an execution screen of the second application.

Figure 19A:
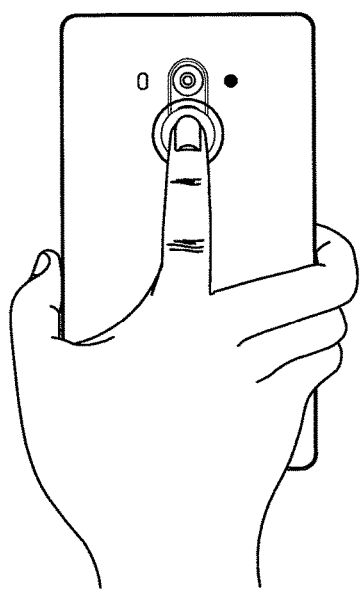
Figure 19B:
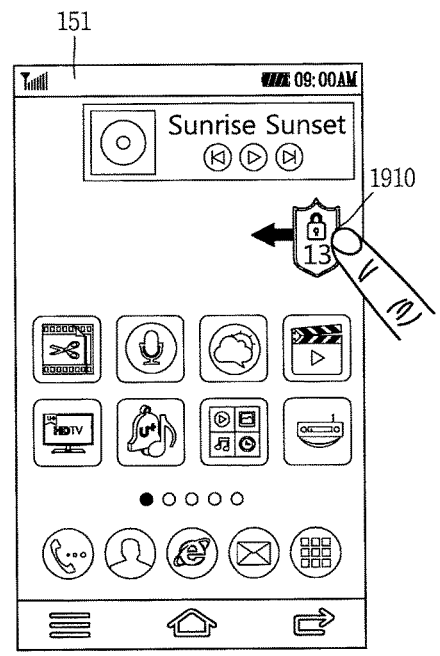
Figure 19C:
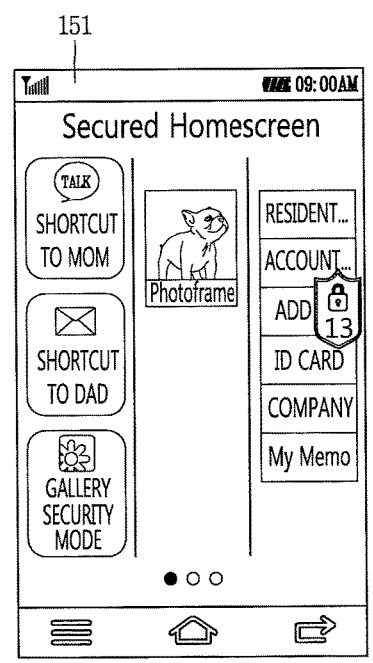

Furthermore, as illustrated above in FIG. 17, when a home screen page is displayed on the touch screen 151, an icon of security set application can be displayed in response to a preset type of touch to the graphic object. In another example, when a fingerprint is recognized and a home screen page is displayed on the touch screen 151 as illustrated in FIG. 19(a), and a graphic object 1910 is displayed, and a preset type of touch is applied to the graphic object 1910 as illustrated in FIG. 19(b), the controller 180 can provide security set information, information on security set content, and security set applications stored in the terminal at the same time. In other words, a preset type of touch to the graphic object 1910 on a home screen page can provide an overall status for security set information stored in the mobile terminal as shown in FIG. 19(c). In this instance, the user can access security set information, respectively, through the selection of the displayed information.

Further, as described above, a graphic object is continuously displayed while a fingerprint is being recognized. In other words, the graphic object may be continuously displayed even when currently displayed screen information is changed to the screen information corresponding to an execution screen of another application. In this instance, the graphic object may be used to access security set information provided through an application corresponding to the changed screen information.

In addition, when a number of the security set information corresponding to screen information prior to being changed is different from that of security set information corresponding to the changed screen information, a number of security set information contained in a graphic object may be changed.

Hereinafter, a method of displaying security set information will be described in more detail with reference to the accompanying drawings. In particular, FIGS. 20 to 22 are conceptual views illustrating a method of displaying security set information in a mobile terminal according to an embodiment of the present disclosure.

Figure 20A:
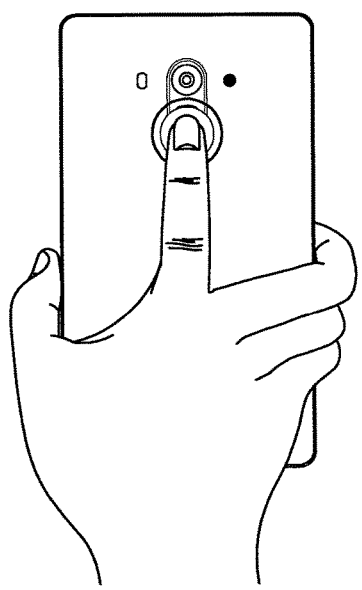
FIGS. 20(a) to 21C(c) and 22 are conceptual views illustrating a method of displaying security set information in a mobile terminal according to an embodiment of the present disclosure.
Figure 20B:
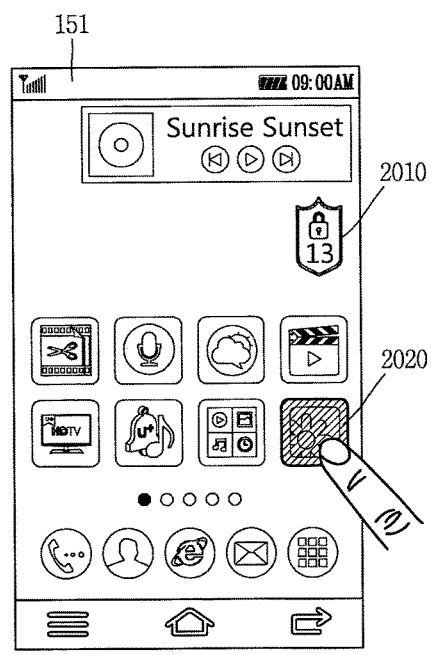
Figure 20C:
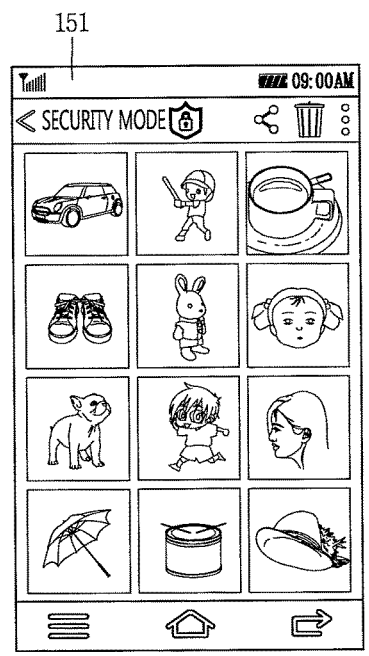

First, a method of displaying security set information when an icon of an application is selected and a graphic object is displayed will be described. As shown in FIGS. 20(a) and 20(b), a fingerprint is recognized when a home screen page is displayed on the touch screen 151, and a graphic object 2010 is displayed as illustrated in FIG. 20(b). Furthermore, when an icon 2020 of an application included in a home screen page is selected and the graphic object 2010 is displayed as illustrated in FIG. 20(b), the controller 180 displays an execution screen of the selected application as illustrated in FIG. 20(c).

In addition, the controller 180 can display security set information among information provided through the selected application. In other words, the execution screen includes security set information among information provided through the selected application. In addition, the controller 180 can display only security set information through the execution screen. In another example, the controller 180 can preferentially display security set information compared to general information on the execution screen.

Further, in this instance, when a user's finger contact is released from the fingerprint recognition sensor, the controller 180 can end the display of security set information, and display general information associated with the selected application.

Figure 21A:
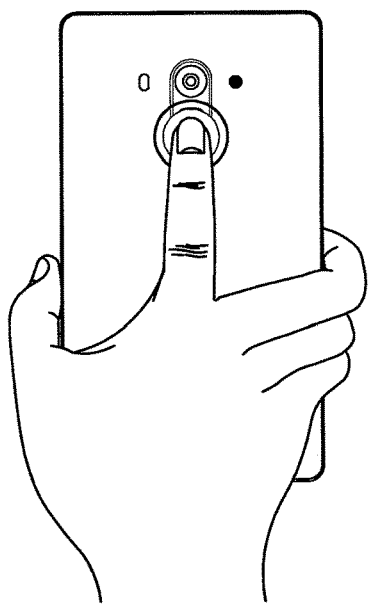
Figure 21A:
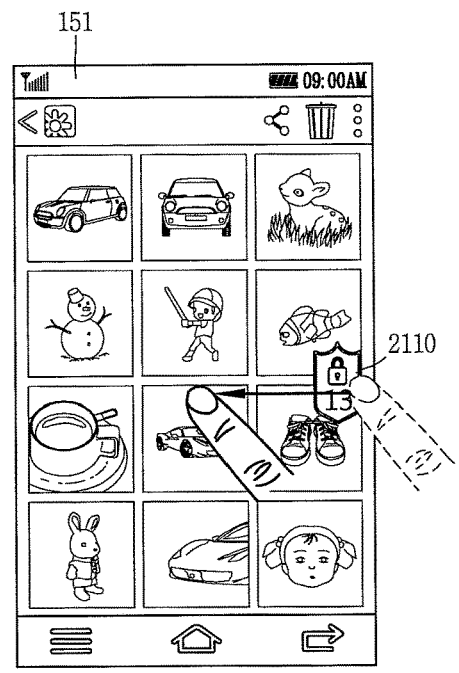
Figure 21A:
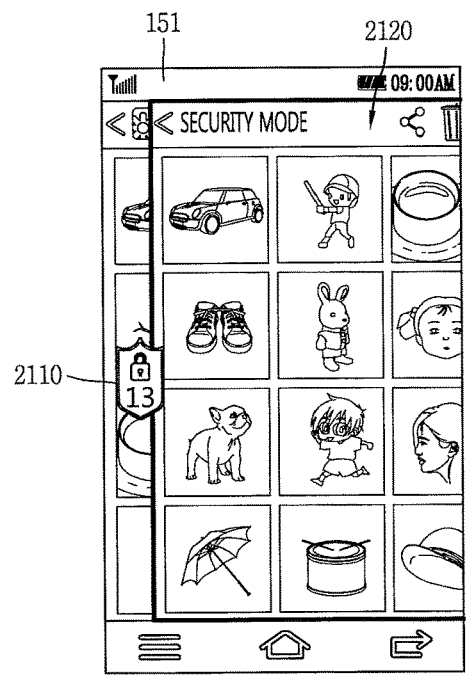
Figure 22:
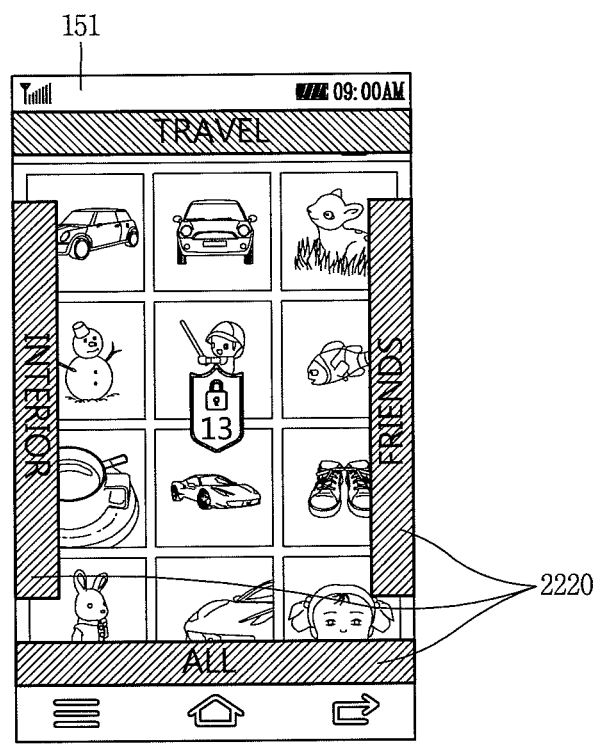

Further, when a preset type of touch is applied to a graphic object 2110 as illustrated in FIGS. 21A(a) and 21A(b), the controller 180 can display a new page 2120 containing only security set information on the touch screen 151 as illustrated in FIG. 21A(c). More specifically, the controller 180 can display the new page 2120 according to a drag touch in one direction applied to the graphic object 2110. In addition, the display location of the graphic object 2110 may be changed according to the drag touch.

Further, the controller 180 can stop displaying the new page 2120 in response to a drag touch to the graphic object 2110 in a direction opposite to the one direction. The general information may be displayed on the touch screen. In addition, the general information can be redisplayed on the touch screen 151 when the display of security set information is stopped or even when security is released.

Figure 21B:
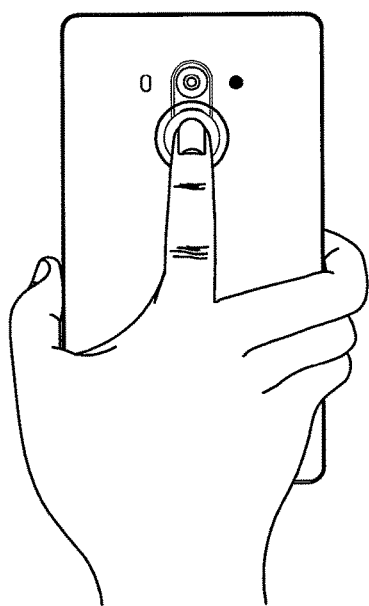
Figure 21B:
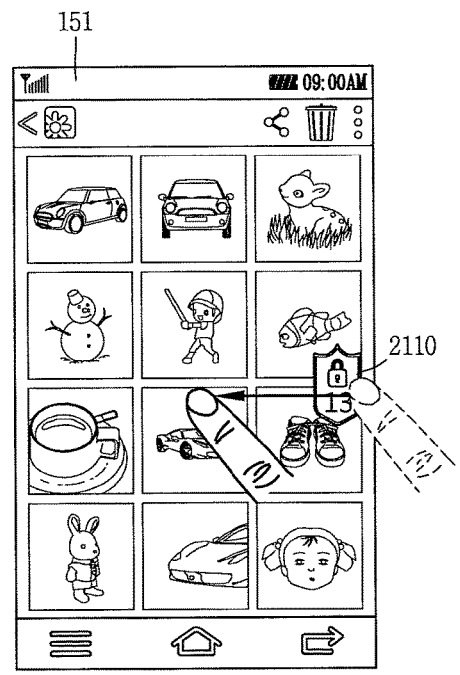
Figure 21B:
Figure 21C:
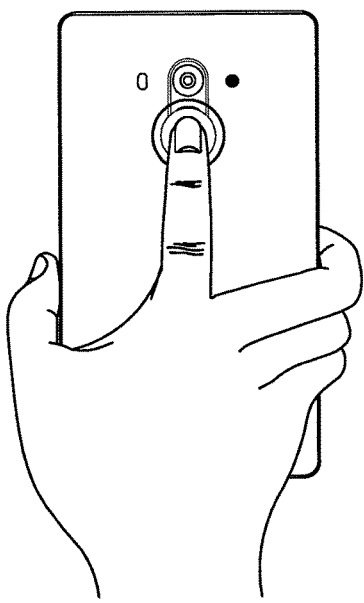
Figure 21C:
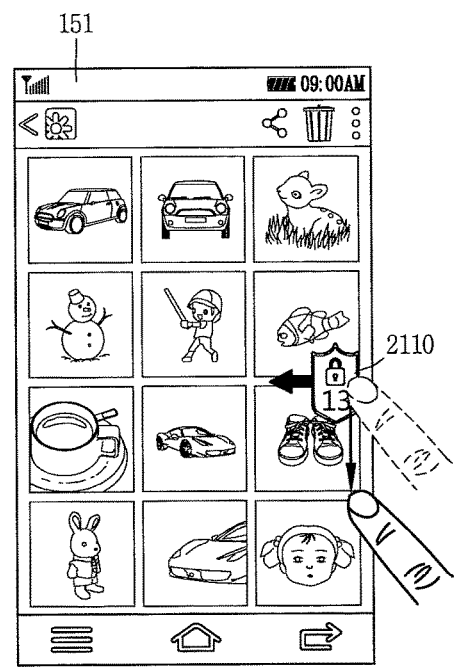
Figure 21C:
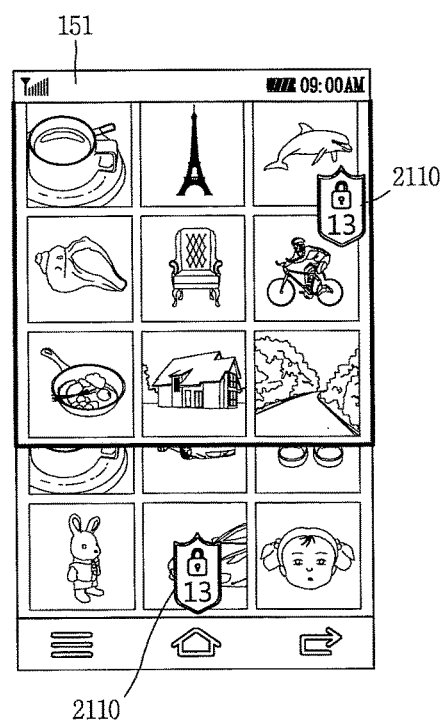

Further, the controller 180 can display security set information (or security set information included in different folders) corresponding to different categories according to a touch direction of a drag touch applied to a graphic object as illustrated in FIGS. 21B and 21C. In other words the controller 180 can to display different security set information on the touch screen according to a touch direction of the drag touch started from the graphic object 2110.

For example, as illustrated in FIG. 21B(a) to 21B(c), when a drag touch is applied to a graphic object 2110 in a first direction, the controller 180 can display security set information included in a first folder (or first category, for example, friend folder). Furthermore, as illustrated in FIG. 21C(a) to 21C(c), when a drag touch is applied to a graphic object 2110 in a second direction different from the first direction, the controller 180 can display security set information included in a second folder (or second category, for example, travel folder).

Further, when a preset user's fingerprint is recognized through the fingerprint recognition sensor, the controller 180 can display guide images on the touch screen corresponding to different categories, respectively, on at least one edge region of the touch screen along with the display of the graphic object. Furthermore, when a graphic object is dragged toward any one edge of the touch screen, the controller 180 can display security set information included in a category corresponding to a guide image displayed on an edge region corresponding to the any one edge.

In other words, the controller 180 can display guide information (or guide image 2220) for guiding a drag direction of the graphic object 2210 as illustrated in FIG. 22. In other words, when the graphic object 2210 is dragged in any direction, the controller 180 can display guide information 2220 on different regions, respectively, to guide which security set information is displayed. Furthermore, when the graphic object 2210 is dragged toward different regions, respectively, the controller 180 can display different security set information.

Figure 23A:
FIGS. 23A(a) to 23C(b) are conceptual views illustrating a method of setting or releasing a security mode in a mobile terminal according to an embodiment of the present disclosure.
Figure 23A:
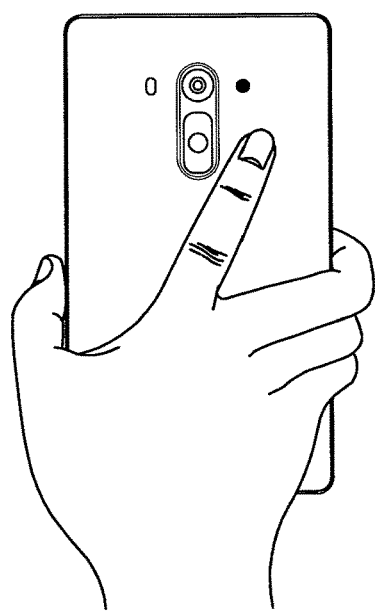
Figure 23A:
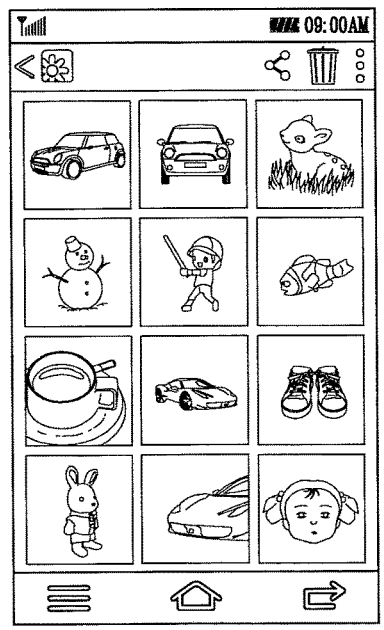

In addition, a mobile terminal according to an embodiment of the present disclosure can be operated in a security mode while a graphic object is displayed in response to fingerprint recognition. Such a security mode may be switched to a general mode through various methods, and hereinafter, a method of ending a security mode will be described in more detail with reference to the accompanying drawings. In particular, FIGS. 23A, 23B and 23C are conceptual views illustrating a method of setting or releasing a security mode in a mobile terminal according to an embodiment of the present disclosure.

As described above, when a security mode is performed through an authentication process through fingerprint recognition, the security mode can be stopped based on a user's selection or by the controller 180. For example, as illustrated in FIG. 23A(a) to 23A(c), the controller 180 can end the security mode when a preset user's fingerprint is no longer sensed. In other words, the controller 180 can operate the terminal in a security mode only while a fingerprint is being recognized, and operate the mobile terminal in a general mode when fingerprint recognition is completed, namely, when a finger contact to the fingerprint recognition sensor 130 is released.

Figure 23B:
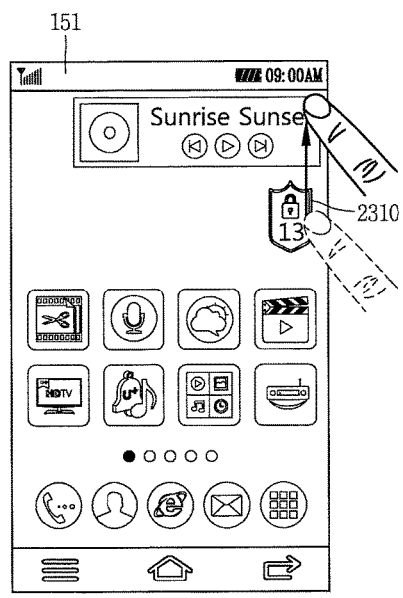
Figure 23B:
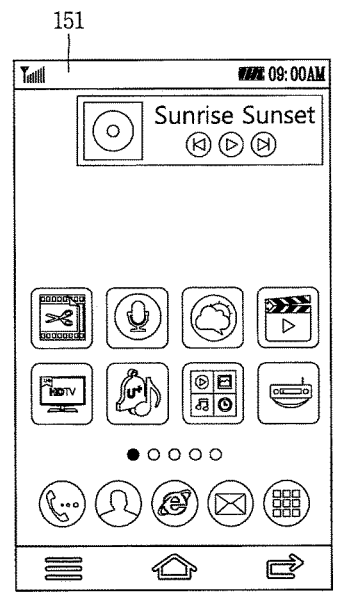
Figure 23C:
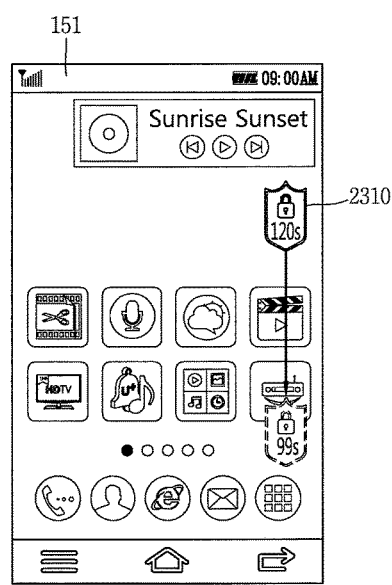
Figure 23C:
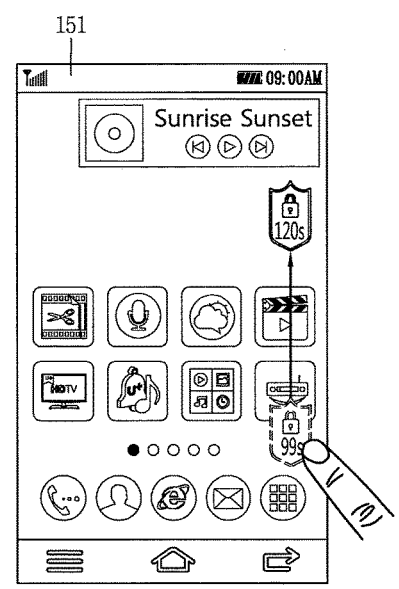

In another example, as illustrated in FIG. 23B(a), when a drag touch or flicking touch above a preset speed is applied to a graphic object 2310, the controller 180 can switch a security mode to a general mode. In addition, as illustrated in FIG. 23B(b), the controller 180 can stop displaying the graphic object 2310 on the touch screen in response to the touch. In another example, the controller 180 can switch a security mode to a general mode based on the graphic object 2310 being moved to a preset region. In addition, the preset region may be a region displayed with a status bar.

In still another example, when a predetermined period of time has passed subsequent to displaying the graphic object, the controller 180 can switch a security mode to a general mode. In this instance, prior to the passage of the preset period of time, the security mode can be maintained even when a user's finger contact to the fingerprint recognition sensor is released. On the contrary, even prior to the passage of the preset period of time, the security mode can be released when a user's finger contact to the fingerprint recognition sensor is released.

For example, as illustrated in FIG. 23C, a security mode maintaining time information can be displayed along with the graphic object 2310. Furthermore, the display location of the graphic object 2310 can also be changed according to the passage of time. As illustrated in FIG. 23C(a), the graphic object 2310 can move in one direction as time has passed. Moreover, as illustrated in FIG. 23C(b), when the graphic object 2310 moves in a direction opposite to the one direction, the controller 180 can extend a security mode maintaining time.

Hereinafter, a method of switching general information to security set information will be described in more detail with reference to the accompanying drawings. In particular FIGS. 24A to 24D are conceptual views illustrating a method of setting specific content to security information in a mobile terminal according to an embodiment of the present disclosure.

Figure 24A:
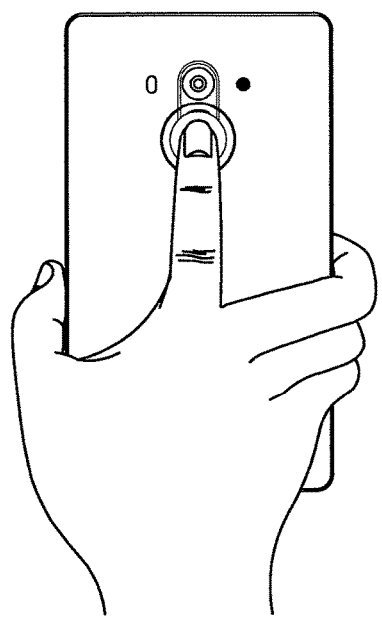
FIGS. 24A(a) to 24D(c) are conceptual views illustrating a method of setting specific content to security information in a mobile terminal according to an embodiment of the present disclosure.
Figure 24A:
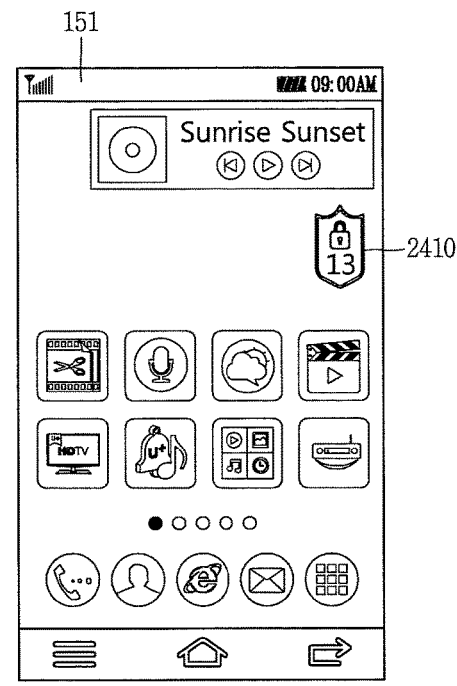
Figure 24A:
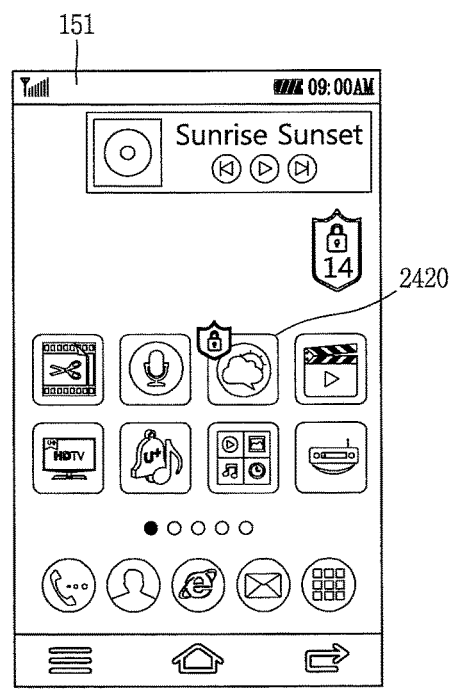
Figure 24A:
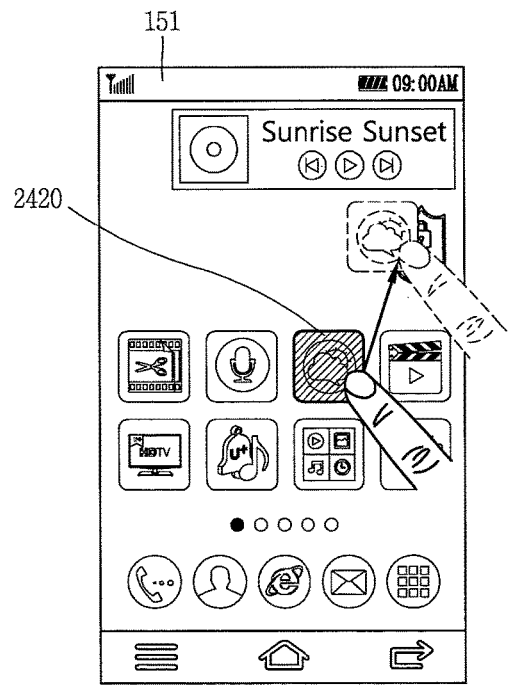

For example, as illustrated in FIG. 24A(a) to 24A(d), when general information (for example, an icon of non-security set application) moves into a graphic object 2410 and the graphic object 2410 is displayed, the controller 180 can change the general information to security set information. In this instance, the non-security set application can be switched to a security set application. Since security is set to the application based on an icon of the application being moved to the graphic object 2410, number information of security set information contained in the graphic object 2410 may be changed based on the icon 2420 being moved to the graphic object 2410 as illustrated in FIG. 24A(d).

Figure 24B:
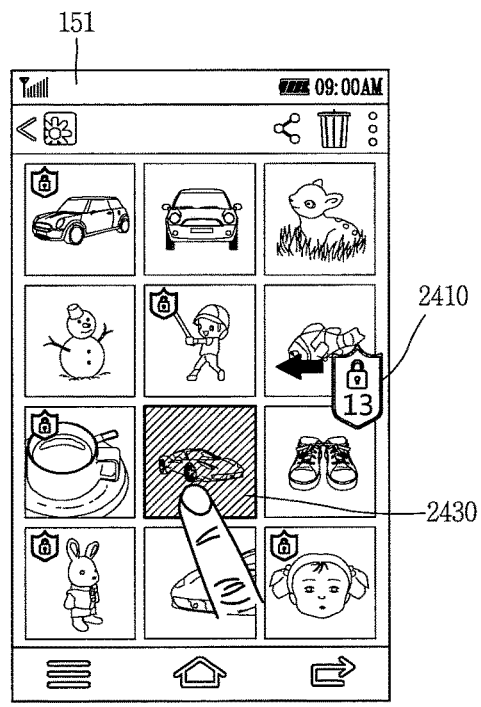
Figure 24B:
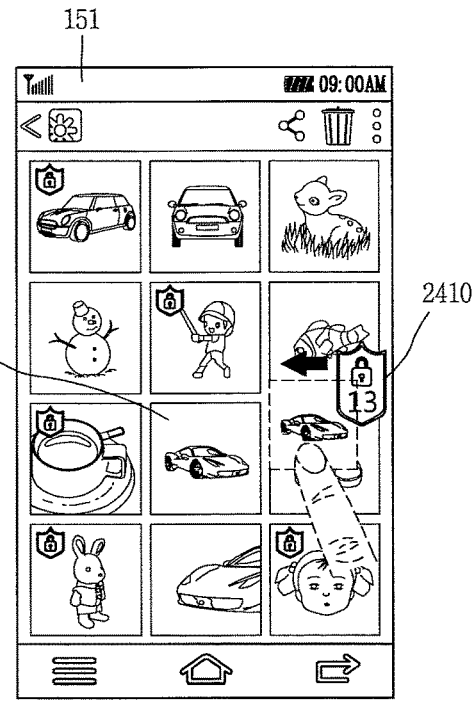
Figure 24B:
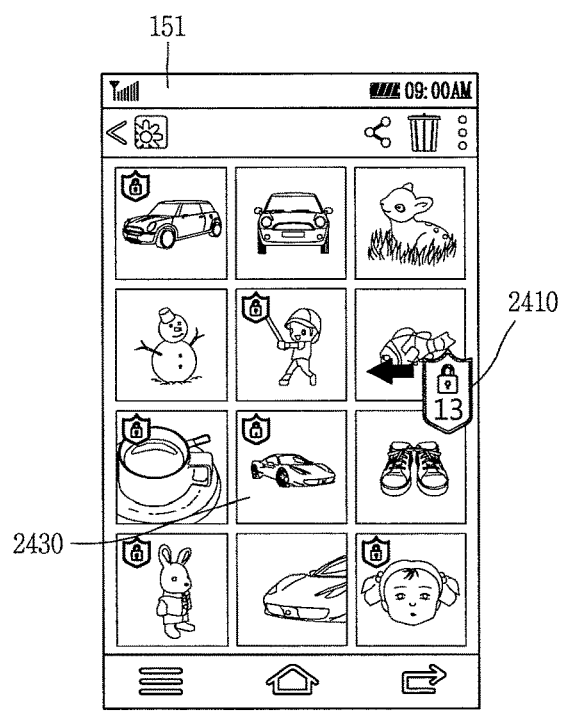
Figure 24C:
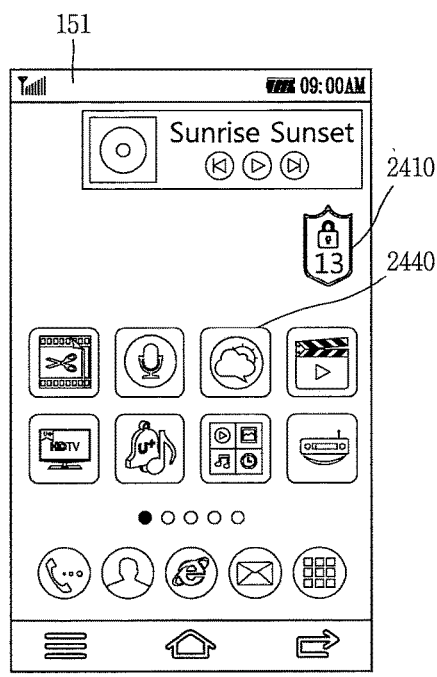
Figure 24C:
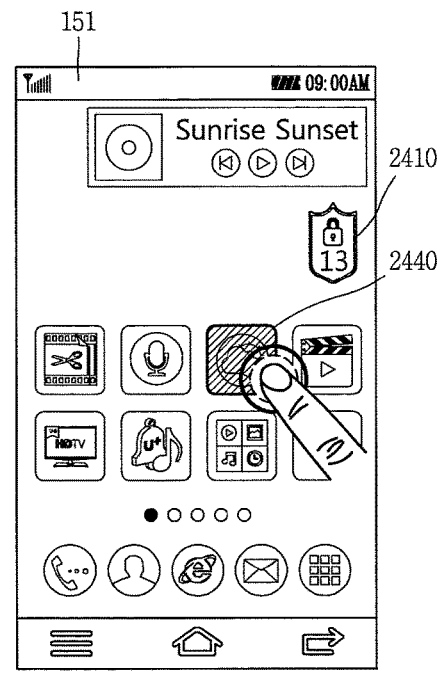
Figure 24C:
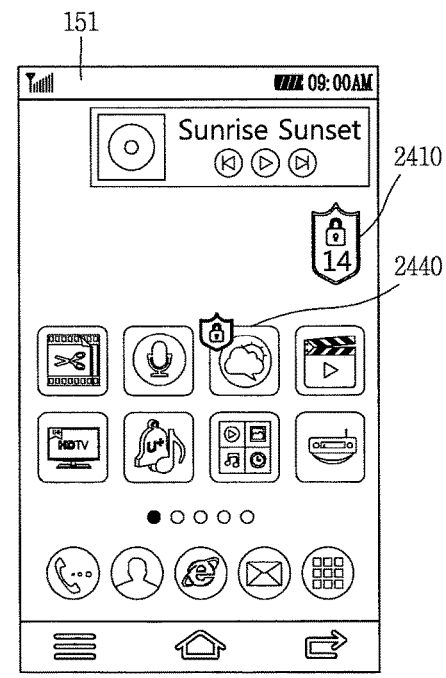

Similarly, as illustrated in FIGS. 24B(a) and 24B(b), when content 2430 selected by a user moves into the graphic object 2410, the content 2430 can be changed to security set information as illustrated in FIG. 24B(c). In another example, when a preset type of touch is applied to general information (for example, an icon of non-security set application 2440) when the graphic object 2410 is displayed as illustrated in FIGS. 24C(a) and 24C(b), the controller 180 can switch the general information to security set information as illustrated in FIG. 24C(c). In this instance, the non-security set application may be switched to a security set application.

Figure 24D:
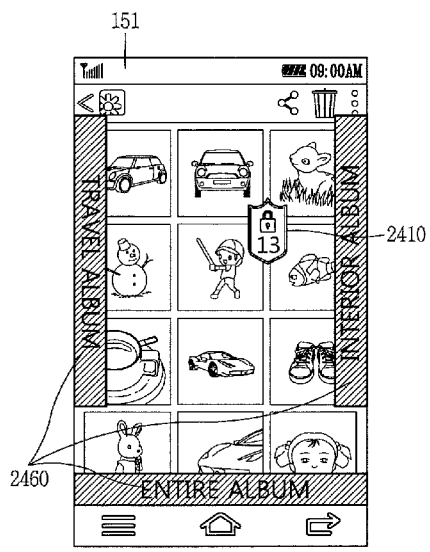
Figure 24D:
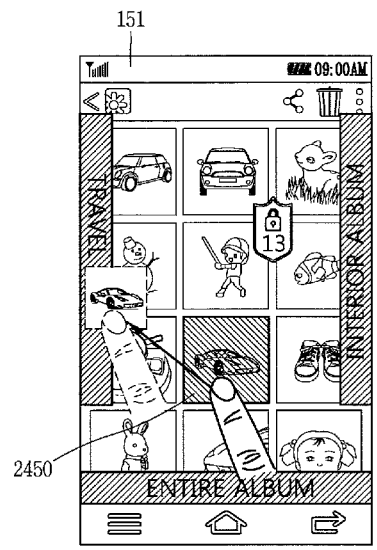
Figure 24D:
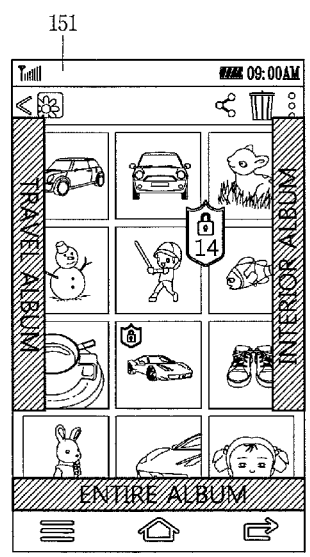

Further, as shown in FIGS. 24D(a) to 24D(c), the controller 180 can display the graphic object 2410 and images corresponding to different categories (or folders) in different regions, respectively. In addition, the controller 180 can switch general information to security set information included in different folders or categories according to the general information (or any content 2450) being moved to a region displayed with which image of the images 2460 based on a user's selection.

For example, as illustrated in FIG. 24D(a) to 24D(c), when the selected image 2450 is moved to a travel album, the selected image 2450 may be security set information included in the travel album. Further, images corresponding to different categories (or folders) in different regions, respectively, may be displayed in a bar shape along one edge of the touch screen as illustrated in the drawing.

In addition, different categories or folders corresponding to images, respectively, displayed in different regions, respectively, may be categories or folders classified within an application corresponding to a currently displayed execution screen. Different categories or folders corresponding to images displayed in different regions may be categories or folders classified without being limited to an application corresponding to a currently displayed execution screen.

Hereinafter, a method of guiding an authentication process when accessing security set information without the authentication process will be described in more detail with reference to the accompanying drawings. In particular, FIG. 25 is a conceptual view illustrating a method of guiding an input of authentication information in a mobile terminal according to an embodiment of the present disclosure.

Figure 25A:
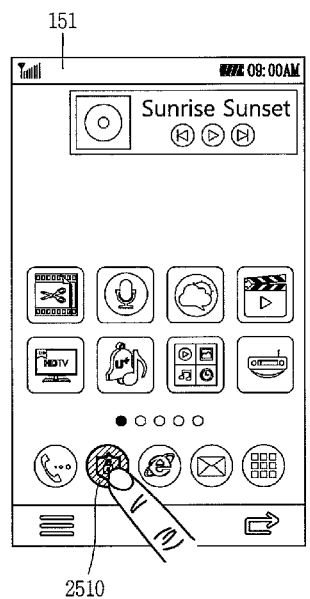
FIGS. 25(a) and 25(b) are conceptual views illustrating a method of guiding an input of authentication information in a mobile terminal according to an embodiment of the present disclosure.
Figure 25B:
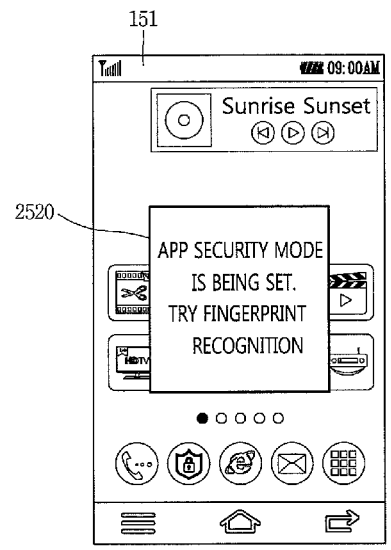

As shown, the controller 180 can display guide information for guiding the execution of an authentication process when an execution request or display request with respect to security set information (for example, security set content, a security set application, etc.) is received without the authentication process. For example, when an icon 2510 of security set application is selected, and a preset user's fingerprint is not recognized on a fingerprint recognition sensor as illustrated in FIG. 25(a), the controller 180 can display guide information 2530 for guiding an authentication process as illustrated in FIG. 25(b). Thus, the user can more easily access security set information.

As described above, according to an embodiment of the present disclosure, when a user having access authority to security set information is recognized, a graphic object for guiding an access to the security set information is displayed to perform various functions associated with security according to various touch gestures to the graphic object. Accordingly, the user can perform a function associated with security in a more intuitive and convenient manner using only a graphic object without a menu entry process with several steps to perform various functions associated with security.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal comprising:
    a touch screen configured to display an execution screen of an application, wherein screen information included in the execution screen is general information for which security is not set;
    a fingerprint recognition sensor configured to recognize a fingerprint of a finger in contact with the fingerprint recognition sensor; and
    a controller configured to:
    receive a preset touch for scrolling the screen information included in the execution screen,
    in response to the preset touch, move the screen information on the touch screen along a touch direction of the preset touch so as to sequentially display additional screen information on the touch screen,
    display guide information including information indicating an existence of secured information, on the touch screen for performing an authentication process to display the secured information related to the application when displayable general information no longer exists in the touch direction in response to the preset touch,
    display the secured information on the touch screen when the authentication process is successfully completed based on authentication information received subsequent to displaying the guide information,
    display the secured information when the sensed fingerprint corresponds to prestored fingerprint information, display the secured information while the finger corresponding to the prestored fingerprint information is in contact with the fingerprint recognition sensor, and
    stop the display of the secured information when the finger contact with the fingerprint recognition sensor is released.

2. The mobile terminal of claim 1, wherein the fingerprint recognition sensor is formed as part of the touch screen, and
    wherein the controller is further configured to display the guide information on the at least part of the touch screen to guide the finger contact with the at least part of the touch screen.

3. The mobile terminal of claim 1, wherein the touch screen includes a first region including screen information that has been displayed on the touch screen prior to displaying the secured information and a second region displayed with the secured information, and
    wherein when at least part of information displayed in the second region moves into the first region based on a selection, the controller is further configured to release a security setting for the at least part of the information moved into the first region.

4. The mobile terminal of claim 3, wherein the controller is further configured to:
    perform an authentication process for releasing a security for the at least part of the information displayed in the second region in response to a touch input for moving the at least part of the information, and
    move and display the at least part of the information into the first region when the authentication process is successfully completed.

5. The mobile terminal of claim 1, wherein the controller is further configured to display a graphic image on the touch screen indicating an existence of the secured information on at least one edge region of the touch screen.

6. The mobile terminal of claim 1, wherein the guide information includes a plurality of graphic objects corresponding to a plurality of authentication methods, respectively, associated with the execution of the authentication process, and
    wherein the controller is further configured to perform a different authentication process according to which one of the plurality of graphic objects is selected.

7. The mobile terminal of claim 6, wherein the plurality of authentication methods includes a fingerprint recognition method including the recognition of the fingerprint of the finger in contact with the fingerprint recognition sensor and at least one of a face recognition method, a voice recognition method, a password input method and a touch pattern input method.

8. A method of controlling a mobile terminal, the method comprising:
    displaying, via a touch screen of the mobile terminal, an execution screen of an application, wherein screen information included in the execution screen is general information for which security is not set;
    receiving a preset touch for scrolling the screen information included in the execution screen;
    in response to the preset touch applied to the touch screen, moving, via a controller of the mobile terminal, the screen information on the touch screen along a touch direction of the preset touch so as to sequentially display additional screen information on the touch screen;
    displaying guide information including information indicating an existence of secured information, on the touch screen for performing an authentication process to display the secured information related to the application when displayable general information no longer exists in the touch direction in response to the preset touch;

displaying the secured information on the touch screen when the authentication process is successfully completed based on authentication information received subsequent to displaying the guide information;

recognizing a fingerprint of a finger in contact with a fingerprint recognition sensor;

displaying the secured information when the sensed fingerprint corresponds to prestored fingerprint information;

displaying the secured information while the finger corresponding to the prestored fingerprint information is in contact with the fingerprint recognition sensor; and stopping the display of the secured information when the finger contact with the fingerprint recognition sensor is released.

* * * * *